(12) United States Patent
Chen et al.

(10) Patent No.: US 10,511,860 B2
(45) Date of Patent: Dec. 17, 2019

(54) SIGNAL TRANSFORMING METHOD AND DEVICE

(71) Applicant: SAMSUNG ELECTRONICS CO., LTD., Suwon-si (KR)

(72) Inventors: Jie Chen, Beijing (CN); Xing guo Zhu, Zhejiang (CN); Yu Lu, Zhejiang (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/955,411

(22) Filed: Apr. 17, 2018

(65) Prior Publication Data

US 2018/0242021 A1    Aug. 23, 2018

Related U.S. Application Data

(62) Division of application No. 14/898,276, filed as application No. PCT/KR2014/005274 on Jun. 16, 2014, now abandoned.

(30) Foreign Application Priority Data

Jun. 14, 2013   (CN) .......................... 2013 1 0238184

(51) Int. Cl.
*H04N 7/12*         (2006.01)
*H04N 19/625*       (2014.01)
(Continued)

(52) U.S. Cl.
CPC ......... *H04N 19/625* (2014.11); *H04N 19/122* (2014.11); *H04N 19/154* (2014.11);
(Continued)

(58) Field of Classification Search
CPC ........................... H04N 19/176; H04N 19/122
(Continued)

(56) References Cited

U.S. PATENT DOCUMENTS

2005/0213835 A1*  9/2005  Guangxi ............... G06F 17/147
                                                       382/250
2005/0265445 A1   12/2005  Xin et al.
(Continued)

FOREIGN PATENT DOCUMENTS

CN          1860795 A       11/2006
CN          1992904 A        7/2007
(Continued)

OTHER PUBLICATIONS

Communication dated Sep. 24, 2014, issued by the International Searching Authority in counterpart International Application No. PCT/KR2014/005274 (PCT/ISA/210, 237).
(Continued)

*Primary Examiner* — Richard T Torrente
(74) *Attorney, Agent, or Firm* — Sughrue Mion, PLLC

(57) ABSTRACT

Provided are a signal transforming method and a signal transforming device. For example, the signal transforming method includes determining a minimum-value matrix and a maximum-value matrix with respect to elements of a matrix used in frequency transformation, wherein the minimum-value matrix is configured of elements of minimum value and the maximum-value matrix is configured of elements of maximum value; determining a maximum threshold value of a result value of a function indicating at least one selected from transform distortion, normalization, and orthogonality of the matrix; determining a transform matrix configured of elements that are greater than the elements of the minimum-value matrix and less than the elements of the maximum-value matrix at respective positions of the matrix, and in which the result value of the function is less than the maximum threshold value; and transforming an input signal by using the determined transform matrix.

8 Claims, 41 Drawing Sheets

(51) Int. Cl.
*H04N 19/176* (2014.01)
*H04N 19/122* (2014.01)
*H04N 19/96* (2014.01)
*H04N 19/154* (2014.01)
*H04N 19/70* (2014.01)

(52) U.S. Cl.
CPC ........... *H04N 19/176* (2014.11); *H04N 19/70* (2014.11); *H04N 19/96* (2014.11)

(58) Field of Classification Search
USPC ...................................................... 375/240.2
See application file for complete search history.

(56) References Cited

U.S. PATENT DOCUMENTS

| | | | | |
|---|---|---|---|---|
| 2007/0237232 | A1* | 10/2007 | Chang | H04N 19/51 375/240.16 |
| 2012/0127002 | A1 | 5/2012 | Shibahara et al. | |
| 2012/0201303 | A1 | 8/2012 | Yang et al. | |
| 2013/0114732 | A1* | 5/2013 | Dong | G06F 17/147 375/240.19 |
| 2014/0072240 | A1* | 3/2014 | Lee | H04N 19/61 382/250 |
| 2016/0073114 | A1* | 3/2016 | Kawamura | H04N 19/12 375/240.03 |

FOREIGN PATENT DOCUMENTS

| | | |
|---|---|---|
| CN | 101083768 A | 12/2007 |
| CN | 101938654 A | 1/2011 |
| KR | 10-2011-0118598 A | 10/2011 |
| KR | 10-2012-0098499 A | 9/2012 |

OTHER PUBLICATIONS

Communication issued by the State Intellectual Property Office of P.R. China on Jun. 20, 2017 in counterpart Chinese Patent Application No. 201310238184.0.

Communication dated Mar. 29, 2019, issued by the Malaysian Patent Office in counterpart Malaysian Application No. PI 2015704555.

* cited by examiner

FIG. 6A $$M = \begin{matrix} 128 & 128 & 128 & 128 & 128 & 128 & 128 & 128 \\ 178 & 151 & 101 & 35 & -35 & -101 & -151 & -178 \\ 167 & 69 & -69 & -167 & -167 & -69 & 69 & 167 \\ 151 & -35 & -178 & -101 & 101 & 178 & 35 & -151 \\ 128 & -128 & -128 & 128 & 128 & -128 & -128 & 128 \\ 101 & -178 & 35 & 151 & -151 & -35 & 178 & -101 \\ 69 & -167 & 167 & -69 & -69 & 167 & -167 & 69 \\ 35 & -101 & 151 & -178 & 178 & -151 & 101 & -35 \end{matrix}$$

FIG. 6B $$A = \begin{matrix} 128 & 128 & 128 & 128 & 128 & 128 & 128 & 128 \\ 177 & 150 & 100 & 35 & -35 & -100 & -150 & -177 \\ 167 & 69 & -69 & -167 & -167 & -69 & 69 & 167 \\ 150 & -35 & -177 & -100 & 100 & 177 & 35 & -150 \\ 128 & -128 & -128 & 128 & 128 & -128 & -128 & 128 \\ 100 & -177 & 35 & 150 & -150 & -35 & 177 & -100 \\ 69 & -167 & 167 & -69 & -69 & 167 & -167 & 69 \\ 35 & -100 & 150 & -177 & 177 & -150 & 100 & -35 \end{matrix}$$

FIG. 6C $M =$

[Matrix of numerical values]

$$A = \begin{pmatrix}
64 & 64 & 64 & 64 & 64 & 64 & 64 & 64 & 64 & 64 & 64 & 64 & 64 & 64 & 64 & 64 \\
90 & 87 & 80 & 70 & 57 & 43 & 26 & 9 & -9 & -26 & -43 & -57 & -70 & -80 & -87 & -90 \\
89 & 75 & 50 & 18 & -18 & -50 & -75 & -89 & -89 & -75 & -50 & -18 & 18 & 50 & 75 & 89 \\
87 & 57 & 9 & -43 & -80 & -90 & -70 & -26 & 26 & 70 & 90 & 80 & 43 & -9 & -57 & -87 \\
84 & 35 & -35 & -84 & -84 & -35 & 35 & 84 & 84 & 35 & -35 & -84 & -84 & -35 & 35 & 84 \\
80 & 9 & -70 & -87 & -26 & 57 & 90 & 43 & -43 & -90 & -57 & 26 & 87 & 70 & -9 & -80 \\
75 & -18 & -89 & -50 & 50 & 89 & 18 & -75 & -75 & 18 & 89 & 50 & -50 & -89 & -18 & 75 \\
70 & -43 & -87 & 9 & 90 & 26 & -80 & -57 & 57 & 80 & -26 & -90 & -9 & 87 & 43 & -70 \\
64 & -64 & -64 & 64 & 64 & -64 & -64 & 64 & 64 & -64 & -64 & 64 & 64 & -64 & -64 & 64 \\
57 & -80 & -26 & 90 & -9 & -87 & 43 & 70 & -70 & -43 & 87 & 9 & -90 & 26 & 80 & -57 \\
50 & -89 & 18 & 75 & -75 & -18 & 89 & -50 & -50 & 89 & -18 & -75 & 75 & 18 & -89 & 50 \\
43 & -90 & 57 & 26 & -87 & 70 & 9 & -80 & 80 & -9 & -70 & 87 & -26 & -57 & 90 & -43 \\
35 & -84 & 84 & -35 & -35 & 84 & -84 & 35 & 35 & -84 & 84 & -35 & -35 & 84 & -84 & 35 \\
26 & -70 & 90 & -80 & 43 & 9 & -57 & 87 & -87 & 57 & -9 & -43 & 80 & -90 & 70 & -26 \\
18 & -50 & 75 & -89 & 89 & -75 & 50 & -18 & -18 & 50 & -75 & 89 & -89 & 75 & -50 & 18 \\
9 & -26 & 43 & -57 & 70 & -80 & 87 & -90 & 90 & -87 & 80 & -70 & 57 & -43 & 26 & -9
\end{pmatrix}$$

FIG. 6D

FIG. 6E $$M = \begin{matrix} 64 & 64 & 64 & 64 & 64 & 64 & 64 & 64 \\ 89 & 75 & 50 & 18 & -18 & -50 & -75 & -89 \\ 83 & 36 & -36 & -83 & -83 & -36 & 36 & 83 \\ 75 & -18 & -89 & -50 & 50 & 89 & 18 & -75 \\ 64 & -64 & -64 & 64 & 64 & -64 & -64 & 64 \\ 50 & -89 & 18 & 75 & -75 & -18 & 89 & -50 \\ 36 & -83 & 83 & -36 & -36 & 83 & -83 & 36 \\ 18 & -50 & 75 & -89 & 89 & -75 & 50 & -18 \end{matrix}$$

FIG. 6F $$A = \begin{matrix} 64 & 64 & 64 & 64 & 64 & 64 & 64 & 64 \\ 89 & 75 & 50 & 18 & -18 & -50 & -75 & -89 \\ 84 & 35 & -35 & -84 & -84 & -35 & 35 & 84 \\ 75 & -18 & -89 & -50 & 50 & 89 & 18 & -75 \\ 64 & -64 & -64 & 64 & 64 & -64 & -64 & 64 \\ 50 & -89 & 18 & 75 & -75 & -18 & 89 & -50 \\ 35 & -84 & 84 & -35 & -35 & 84 & -84 & 35 \\ 18 & -50 & 75 & -89 & 89 & -75 & 50 & -18 \end{matrix}$$

FIG. 6G $$M = \begin{matrix} 64 & 64 & 64 & 64 \\ 83 & 36 & -36 & -83 \\ 64 & -64 & -64 & 64 \\ 36 & -83 & 83 & -36 \end{matrix}$$

FIG. 6H $$A = \begin{matrix} 64 & 64 & 64 & 64 \\ 84 & 35 & -35 & -84 \\ 64 & -64 & -64 & 64 \\ 35 & -84 & 84 & -35 \end{matrix}$$

FIG. 6I $$M = \begin{matrix} 32 & 32 & 32 & 32 & 32 & 32 & 32 & 32 \\ 44 & 38 & 25 & 9 & -9 & -25 & -38 & -44 \\ 42 & 18 & -18 & -42 & -42 & -18 & 18 & 42 \\ 38 & -9 & -44 & -25 & 25 & 44 & 9 & -38 \\ 32 & -32 & -32 & 32 & 32 & -32 & -32 & 32 \\ 25 & -44 & 9 & 38 & -38 & -9 & 44 & -25 \\ 18 & -42 & 42 & -18 & -18 & 42 & -42 & 18 \\ 9 & -25 & 38 & -44 & 44 & -38 & 25 & -9 \end{matrix}$$

FIG. 6J $$A = \begin{matrix} 32 & 32 & 32 & 32 & 32 & 32 & 32 & 32 \\ 44 & 38 & 25 & 9 & -9 & -25 & -38 & -44 \\ 42 & 17 & -17 & -42 & -42 & -17 & 17 & 42 \\ 38 & -9 & -44 & -25 & 25 & 44 & 9 & -38 \\ 32 & -32 & -32 & 32 & 32 & -32 & -32 & 32 \\ 25 & -44 & 9 & 38 & -38 & -9 & 44 & -25 \\ 17 & -42 & 42 & -17 & -17 & 42 & -42 & 17 \\ 9 & -25 & 38 & -44 & 44 & -38 & 25 & -9 \end{matrix}$$

CODING UNIT (1010)

SIGNAL TRANSFORMING METHOD AND DEVICE

CROSS-REFERENCE TO RELATED APPLICATIONS

This application is a divisional of U.S. application Ser. No. 14/898,276 filed on Dec. 14, 2015, which is a U.S. national stage application under 35 USC 371 of International Application No. PCT/KR2014/005274, filed on Jun. 16, 2014, in the Korean Intellectual Property Office, which claims priority from Chinese Application No. 201310238184.0, filed on Jun. 14, 2013, in the Chinese Intellectual Property Office, the disclosures of which are incorporated herein by reference in their entireties.

TECHNICAL FIELD

Various embodiments relate to a digital signal processing field, and more particularly, to a method and device for improving digital signal transformation.

BACKGROUND ART

A video and image coding technology as in a digital signal processing mode is used for wide utilization of digital video and image which are multimedia information. Video coding for current block-based video coding hybrid frame generally includes prediction coding, transformation and quantization, entropy coding, and loop filter. Among them, the transformation is to remove correlation between prediction residuals and to concentrate energies of the residuals, which may facilitate the subsequent entropy coding and may improve the efficiency of the video coding as a whole.

DETAILED DESCRIPTION OF THE INVENTION

Technical Problem

A method and device which are effective in determining a transform matrix used to transform an input signal may be provided.

Technical Solution

According to a first aspect of the present disclosure, there is provided a signal transforming method including determining a minimum-value matrix and a maximum-value matrix with respect to elements of a matrix used in frequency transformation, wherein the minimum-value matrix is configured of elements of minimum value and the maximum-value matrix is configured of elements of maximum value; determining a maximum threshold value of a result value of a function indicating at least one selected from transform distortion, normalization, and orthogonality of the matrix; determining a transform matrix configured of elements that are greater than the elements of the minimum-value matrix and less than the elements of the maximum-value matrix at respective positions of the matrix, and in which the result value of the function is less than the maximum threshold value; and transforming an input signal by using the determined transform matrix.

The determining of the minimum-value matrix and the maximum-value matrix may include determining, based on a size of the matrix, a DCT matrix that is a matrix used in a DCT transform; and determining, by using the determined DCT matrix, the minimum-value matrix and the maximum-value matrix which are configured of integer elements.

The determining, by using the determined DCT matrix, of the minimum-value matrix and the maximum-value matrix may include determining the minimum-value matrix as a matrix including element values obtained by multiplying each of elements of the determined DCT matrix by a predetermined factor, rounding multiplication results of the multiplying, and then subtracting a predetermined value from results of the rounding; and determining the maximum-value matrix as a matrix including element values obtained by multiplying each of the elements of the determined DCT matrix by the predetermined factor, rounding the results of the multiplying, and then adding the predetermined value to the results of the rounding.

The determining of the maximum threshold value may include determining a reference matrix including the element values obtained by multiplying each of the elements of the determined DCT matrix by the predetermined factor, and rounding the results of the multiplying; determining a reference matrix function value that is a result value of a function indicating at least one selected from transform distortion, normalization, and orthogonality of the reference matrix; and determining the reference matrix function value as the maximum threshold value.

The determining of the maximum threshold value may include determining a reference matrix that is a matrix configured of integer elements, based on a method defined in H.265; determining a reference matrix function value that is a result value of a function indicating at least one selected from transform distortion, normalization, and orthogonality of the reference matrix; and determining the reference matrix function value as the maximum threshold value.

The determining of the maximum threshold value may include determining the maximum threshold value by multiplying a number of rows of the transform matrix by a predetermined value.

The transforming of the input signal by using the determined transform matrix may include determining an input matrix that is a matrix with respect to the input signal; and performing an operation on the determined transform matrix and the input matrix, and thus determining an output matrix that is a matrix with respect to an output signal.

The determining of the output matrix may include determining a matrix transposed from the determined transform matrix, and performing an operation on the matrix transposed from the determined transform matrix and the input matrix, and thus determining an output matrix that is a matrix with respect to the output signal.

According to a second aspect of the present disclosure, there is provided a signal transforming device including a range determiner configured to determine a minimum-value matrix and a maximum-value matrix with respect to elements of a matrix used in frequency transformation, wherein the minimum-value matrix is configured of elements of minimum value and the maximum-value matrix is configured of elements of maximum value; a maximum threshold value determiner configured to determine a maximum threshold value of a result value of a function indicating at least one selected from transform distortion, normalization, and orthogonality of the matrix; a transform matrix determiner configured to determine a transform matrix configured of elements that are greater than the elements of the minimum-value matrix and less than the elements of the maximum-value matrix at respective positions of the matrix, and in which the result value of the function is less than the maximum threshold value; and a transformer configured to transform an input signal by using the determined transform matrix.

The range determiner may be further configured to determine, based on a size of the matrix, a DCT matrix that is a matrix used in a DCT transform, and to determine, by using the determined DCT matrix, the minimum-value matrix and the maximum-value matrix which are configured of integer elements.

The range determiner may be further configured to determine the minimum-value matrix as a matrix including element values obtained by multiplying each of elements of the determined DCT matrix by a predetermined factor, rounding multiplication results of the multiplying, and then subtracting a predetermined value from results of the rounding, and to determine the maximum-value matrix as a matrix including element values obtained by multiplying each of the elements of the determined DCT matrix by the predetermined factor, rounding the results of the multiplying, and then adding the predetermined value to the results of the rounding.

The maximum threshold value determiner may be further configured to determine a reference matrix including the element values obtained by multiplying each of the elements of the determined DCT matrix by the predetermined factor, and rounding the results of the multiplying, to determine a reference matrix function value that is a result value of a function indicating at least one selected from transform distortion, normalization, and orthogonality of the reference matrix, and to determine the reference matrix function value as the maximum threshold value.

The maximum threshold value determiner may be further configured to determine a reference matrix that is a matrix configured of integer elements, based on a method defined in H.265, to determine a reference matrix function value that is a result value of a function indicating at least one selected from transform distortion, normalization, and orthogonality of the reference matrix, and to determine the reference matrix function value as the maximum threshold value.

The maximum threshold value determiner may be further configured to determine the maximum threshold value by multiplying a number of rows of the transform matrix by a predetermined value.

The transformer may be further configured to determine an input matrix that is a matrix with respect to the input signal, and to perform an operation on the determined transform matrix and the input matrix and thus to determine an output matrix that is a matrix with respect to the output signal.

The transformer may be further configured to determine a matrix transposed from the determined transform matrix, and to perform an operation on the matrix transposed from the determined transform matrix and the input matrix and thus to determine an output matrix that is a matrix with respect to the output signal.

According to a third aspect of the present disclosure, there is provided a computer-readable recording medium having recorded thereon a program which, when executed by a computer, performs the method of the first aspect.

Advantageous Effects

Various embodiments of the present invention may provide a signal transforming method that is effective for performance of signal transformation, particularly for frequency transform.

DESCRIPTION OF THE DRAWINGS

FIGS. 6A-6N illustrates diagrams for describing a method of determining a matrix M that is a reference matrix and a matrix A that is a transform matrix, according to various embodiments.

MODE OF THE INVENTION

Figure 1:
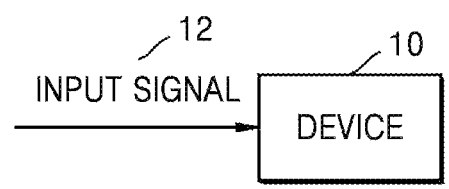
FIG. 1 illustrates a diagram of a scheme in which signal transformation is performed by a device, according to various embodiments.

Hereinafter, throughout various embodiments of the present invention described in the specification, an 'image' may generally indicate not only a still image but may also indicate a moving picture such as a video.

Hereinafter, throughout various embodiments of the present invention described in the specification, a capital alphabet may mean a matrix.

Hereinafter, a transform matrix described in the specification may mean a matrix used to perform frequency transform, and may mean a transform kernel matrix. For example, the transform matrix may be used to perform a DCT transform.

Hereinafter, with reference to FIGS. 1 through 27, an image data processing method and device according to various embodiments are disclosed.

In addition, throughout the specification, a singular form may include plural forms, unless there is a particular description contrary thereto.

Hereinafter, embodiments will be described in detail with reference to accompanying drawings. Those components that are the same or are in correspondence are rendered the same reference numeral regardless of the figure number, and redundant explanations therefor are omitted.

In video image coding standards such as JPEG, MPEG-1/2/4, and H.261, floating-point discrete cosine transform (DCT) may be used. In practice, precision of floating-point arithmetic of different hardware products may be different. Therefore, a mismatch may occur between a coder and a decoder with complying with these standards. In view of the above, H.264/AVC, H.265, and video coding standards such as AVS1 and AVS2 may be used in performing integer transformation. In H.264/AVC and AVS, all values in a transform kernel are integers, a proportion between the values may not be directly associated with a DCT matrix, and modules of each transform basis may not be identical. A scaling operation and a scaling matrix corresponding thereto may be introduced during a transformation process. A maximum size of a transform in H.264/AVC and AVS may be 8×8. The introduction of the scaling operation may decrease complexity in many calculations. The scaling operation may simplify a calculation of the transformation process as a whole. However, when the size of the transform becomes very large, such as 32×32 and 64×64, if the scaling operation is used, the calculation may be complicated. In recent international H.245 and AVS2 standards, an integer DCT transform may be used. A transform matrix A that is a matrix with respect to the transformation may be obtained by multiplying a DCT matrix including irrational elements by a predetermined factor, as shown in formula (1). In formula (1) and subsequent formulas, Factor may be the predetermined factor.

$$A=\text{int}\{DCT \times Factor\} \qquad \text{formula (1)}$$

In formula (1), DCT is an irrational DCT matrix whose expression may be as shown in formula (2). "int" is a rounding function. When Factor is the same and the rounding functions are different, obtained transform matrices A may be different. Different predetermined factors and rounding functions may obtain transform matrices having different transformation performances. The transformation performance may include transform distortion, a decorrelation capability influenced by orthogonality and normalization of the transform basis. The design of the rounding function may have a significant impact on the whole transformation.

$$DCT(i,j) = \begin{cases} \dfrac{1}{\sqrt{N}}, & i=0 \\ \sqrt{\dfrac{2}{N}} \times \cos\left(\dfrac{(2 \times j+1) \times i \times \pi}{2N}\right), & i \ne 0 \end{cases} \qquad \text{formula (2)}$$

In formula (2), the size of the transform matrix is N×N.

The performance of each transform matrix in conventional H.265 may be improved. Also, the performance related to the orthogonality and the normalization of the transform basis may be improved. In AVS2 that is being developed, the decorrelation capability of a transform kernel may be improved and the transform distortion resulting from the transform kernel may be decreased.

When the transform matrix is determined, the design of the transformation process may have a significant impact on the performance. In the current AVS2 draft, the bit-width of data during the transformation process may exceed 32-bit, and thus the design of the bit-width may be improved.

Therefore, the design of the transformation process may be improved in H.265 or AVS2 which is being developed. The transform matrix and the transformation process may also be improved. In the video image coding, the decorrelation capability, the orthogonality, and the normalization of an existing digital signal transform kernel may not be sufficient, which may result in excessive transform distortion and unsatisfactory transformation performance.

FIG. 1 illustrates a diagram of a scheme in which signal transformation is performed by a device, according to various embodiments.

A device 10 may receive an input signal 12. The device 10 may process the received input signal 12.

The device 10 may be used in encoding or may be used in decoding.

A method of improving performance of digital signal transformation according to various embodiments is described below. According to the signal transforming method, a matrix A that is a N×N transform matrix may be determined. The transform matrix A may satisfy conditions of formula (3) and formula (4).

$$[DCT(i,j) \times Factor]-2 \le A(i,j) \le [DCT(i,j) \times Factor]+2 \qquad \text{[formula (3)]}$$

$$J(A) < TH \qquad \text{[formula (4)]}$$

In formula (3), A(i,j) may represent an element in the i-th row and j-th column of the transform matrix A. DCT(i,j) may represent an element in the i-th row and j-th column of a DCT matrix. A definition of DCT(i,j) may be referred to the aforementioned formula (2). A predetermined factor may be a value that is greater than 1. [ ] may indicate rounding.

In formula (4), TH may represent a maximum threshold value. J(A) may be a function indicating at least one selected from transform distortion, normalization, and orthogonality of the matrix A as defined in formula (5). For example, J(A) may indicate a new transform rate-distortion cost function defined in formula (5).

$$J(A) = \frac{\alpha \times dist(A) + \beta \times norm(A) + \gamma \times orth(A)}{\alpha + \beta + \gamma} \quad \text{[formula (5)]}$$

In formula (5), $\alpha$, $\beta$, $\gamma$ may represent three parameters that satisfy $\beta<\alpha$, $\gamma<\alpha$. Formula (5) may include three newly-defined factors associated with the transformation performance. dist(A) may indicate a value associated with DCT distortion, normal(A) may indicate a value associated with the normalization, and orth(A) may indicate a value associated with the orthogonality. For example, J(A) may represent a value indicating the distortion, the normalization, and the orthogonality of the DCT transform with respect to the transform matrix A.

For example, dist(A), normal(A), and orth(A) may be defined in formula (6).

$$\begin{cases} dist(A) = \sum_{i=1}^{N} \sum_{j=1,i\neq j}^{N} \frac{|P(i,j)|}{|P(i,i)|} \\ normal(A) = \sum_{i=1}^{N} |Q(i,i)-1| \\ orth(A) = \sum_{i=1}^{N} \sum_{j=1,j\neq i}^{N} |Q(i,j)| \\ P = A \times DCT^T \\ Q = \frac{A^T \times A}{\text{Factor}^2} \end{cases} \quad \text{[formula (6)]}$$

In the aforementioned formulas, "A" may represent an N×N transform matrix. DCT may represent a DCT matrix including irrational elements. A superscript "T" may represent transpose of a matrix. $\alpha$, $\beta$, $\gamma$ may represent three parameters that satisfy $\beta<\alpha$, $\gamma<\alpha$ and are configured according to actual situations. Here, a condition of $\alpha$, $\beta$, $\gamma$ that satisfy $\beta<\alpha$, $\gamma<\alpha$ is an example, and another condition may be set.

Three examples of determining a value of TH are described.

In the first example of determining the maximum threshold value, it may be determined as TH=J(M). M may be a matrix obtained by rounding each element in a calculation result obtained by multiplying the irrational DCT matrix by the predetermined factor. For example, [DCT(i,j)×Factor] may be an element of M.

$$J(M) = \frac{\alpha \times dist(M) + \beta \times norm(M) + \gamma \times orth(M)}{\alpha + \beta + \gamma} \quad \text{[formula (7)]}$$

In formula (7), $\alpha$, $\beta$, $\gamma$ may satisfy a predetermined condition. For example, $\alpha$, $\beta$, $\gamma$ may satisfy $\beta<\alpha$, $\gamma<\alpha$.

An example of definitions of dist(M), normal(M), and orth(M) may be shown in formula (8).

$$\begin{cases} dist(M) = \sum_{i=1}^{N} \sum_{j=1,i\neq j}^{N} \frac{|P(i,j)|}{|P(i,i)|} \\ normal(M) = \sum_{i=1}^{N} |Q(i,i)-1| \\ orth(M) = \sum_{i=1}^{N} \sum_{j=1,j\neq i}^{N} |Q(i,j)| \\ P = M \times DCT^T \\ Q = \frac{M^T \times M}{\text{Factor}^2} \end{cases} \quad \text{[formula (8)]}$$

In the aforementioned formulas, "T" may represent transpose of a matrix. P(i,j) may represent an element in the i-th row and j-th column of Matrix P. Q(i,j) may represent an element in the i-th row and j-th column of Matrix Q. DCT may represent the DCT matrix including irrational elements.

In the second example of determining the maximum threshold value, when predetermined factor=$2^6 \times N^{(1/2)}$, N=4, 8, 16 or 32, and M is a transform matrix defined in the H.265 standard, TH=J(M). However, this example is only an embodiment, and according to the example, in order to obtain the maximum threshold value, the device 10 may determine a reference matrix or a transform matrix according to the H.264 or H.265 standard, may apply the aforementioned formula (5) to the determined reference matrix or transform matrix, and thus may determine the maximum threshold value.

In the third example of determining the maximum threshold value, it may be determined as TH=N×0.02.

A device for improving performance of the digital signal transformation according to various embodiments is described. According to the signal transforming device, a matrix A that is an N×N transform matrix may be determined. The transform matrix A may satisfy conditions of the aforementioned formulas (3) and (4).

In formula (3), A(i,j) may represent an element in the i-th row and j-th column of the matrix A. DCT(i,j) may represent an element in the i-th row and j-th column of a DCT matrix. The definition of DCT(i,j) may be referred to formula (2) described below. A predetermined factor may be greater than 1. [ ] may indicate rounding.

In formula (4), TH may represent a maximum threshold value. For example, J(A) may indicate a new transform rate-distortion cost function defined in the formula (5).

In formula (5), $\alpha$, $\beta$, $\gamma$ may satisfy a predetermined condition. For example, $\alpha$, $\beta$, $\gamma$ may satisfy $\beta<\alpha$, $\gamma<\alpha$. Also, an example of definitions of dist(A), normal(A), and orth(A) may be shown in formula (6).

In the aforementioned formulas, "T" may represent transpose of a matrix. P(i,j) may represent an element in the i-th row and j-th column of Matrix P. Q(i,j) may represent an element in the i-th row and j-th column of Matrix Q. DCT may represent a DCT matrix including irrational elements.

According to the embodiment, the maximum threshold value determined by the device may be J(M). M may be an N×N matrix obtained by rounding each element in a calculation result obtained by multiplying the DCT matrix including irrational elements by the predetermined factor. For example, [DCT(i,j)×Factor] may be an element of M.

In the aforementioned formula (7), $\alpha$, $\beta$, $\gamma$ may represent three parameters that satisfy $\beta<\alpha$, $\gamma<\alpha$. Here, a condition of $\alpha$, $\beta$, $\gamma$ that satisfy $\beta<\alpha$, $\gamma<\alpha$ is an example, and another condition may be set.

An example of definitions of dist(M), normal(M), and orth(M) may be shown in the aforementioned formula (8).

In the aforementioned formulas, "T" may represent transpose of a matrix. P(i,j) may represent an element in the i-th row and j-th column of Matrix P. Q(i,j) may represent an element in the i-th row and j-th column of Matrix Q. DCT may represent the irrational DCT matrix.

In another embodiment in which the device obtains the maximum threshold value, when predetermined factor=$2^6 \times N^{(1/2)}$, N=4, 8, 16 or 32, and M is a transform matrix defined in the H.265 standard, TH=J(M). The calculation of J(M) is the same as that of J(A) described above.

In another embodiment of obtaining the maximum threshold value, TH=N×0.02.

Various embodiments also describe a digital signal transforming method using the transform matrix determined by the method described in the aforementioned embodiments. The digital signal transforming method may include methods described below.

One-dimensional transformation may be performed on a transformation-target data block X with an L×K matrix according to one of the methods described below.

A matrix Y may be determined by multiplying a matrix A by a matrix X. For example, Y=A×X may be set. Also, a result obtained by adding w1 to each element in the matrix Y may be expressed in the form of a natural binary, and the device 10 may obtain a result of transformation by right shifting the result expressed in the form of a natural binary by s1-bit. Here, A may be an N×N transform matrix determined by the aforementioned methods. Also, in the present embodiment, a condition in which N and L have a same value, w1 and s1 are integers, and w1≥0, s1≥0 may be satisfied. Here, the condition may be an example, and another condition may be set.

A matrix Y may be determined by multiplying a matrix X by a transposed-matrix A. For example, Y=X×A^T may be set. Also, a result obtained by adding w2 to each element in the matrix Y may be expressed in the form of a natural binary, and the device 10 may obtain a result of transformation by right shifting the result expressed in the form of a natural binary by s2-bit. Here, A may be an N×N transform matrix determined by the aforementioned methods. Also, in the present embodiment, a condition in which N and K have a same value, w2 and s2 are integers, and w2≥0, s2≥0 may be satisfied. Here, the condition may be an example, and another condition may be set.

A matrix Y may be determined by multiplying a matrix X by a matrix A. For example, Y=X×A may be set. Also, a result obtained by adding w3 to each element in the matrix Y may be expressed in the form of a natural binary, and the device 10 may obtain a result of transformation by right shifting the result expressed in the form of a natural binary by s3-bit. Here, A may be an N×N transform matrix determined by the aforementioned methods. Also, in the present embodiment, a condition in which N and K have a same value, w3 and s3 are integers, and w3≥0, s3≥0 may be satisfied. Here, the condition may be an example, and another condition may be set.

A matrix Y may be determined by multiplying a transposed-matrix A by a matrix X. For example, Y=A^T×X may be set. Also, a result obtained by adding w4 to each element in the matrix Y may be expressed in the form of a natural binary, and the device 10 may obtain a result of transformation by right shifting the result expressed in the form of a natural binary by s4-bit. Here, A may be an N×N transform matrix determined by the aforementioned methods. Also, in the present embodiment, a condition in which N and L have a same value, w4 and s4 are integers, and w4≥0, s4≥0 may be satisfied. Here, the condition may be an example, and another condition may be set.

Various embodiments also include a digital signal transforming device. The digital signal transforming device may perform one-dimensional transformation on a transformation-target data block X with an L×K matrix, according to one of the methods described below.

A matrix Y may be determined by multiplying a matrix A by a matrix X. For example, Y=A×X may be set. Also, a result obtained by adding w1 to each element in the matrix Y may be expressed in the form of a natural binary, and the device 10 may obtain a result of transformation by right shifting the result expressed in the form of a natural binary by s1-bit. Here, A may be an N×N transform matrix determined by the aforementioned methods. Also, in the present embodiment, a condition in which N and L have a same value, w1 and s1 are integers, and w1≥0, s1≥0 may be satisfied. Here, the condition may be an example, and another condition may be set.

A matrix Y may be determined by multiplying a matrix X by a transposed-matrix A. For example, Y=X×A^T may be set. Also, a result obtained by adding w2 to each element in the matrix Y may be expressed in the form of a natural binary, and the device 10 may obtain a result of transformation by right shifting the result expressed in the form of a natural binary by s2-bit. Here, A may be an N×N transform matrix determined by the aforementioned methods. Also, in the present embodiment, a condition in which N and K have a same value, w2 and s2 are integers, and w2≥0, s2≥0 may be satisfied. Here, the condition may be an example, and another condition may be set.

A matrix Y may be determined by multiplying a matrix X by a matrix A. For example, Y=X×A may be set. Also, a result obtained by adding w3 to each element in the matrix Y may be expressed in the form of a natural binary, and the device 10 may obtain a result of transformation by right shifting the result expressed in the form of a natural binary by s3-bit. Here, A may be an N×N transform matrix determined by the aforementioned methods. Also, in the present embodiment, a condition in which N and K have a same value, w3 and s3 are integers, and w3≥0, s3≥0 may be satisfied. Here, the condition may be an example, and another condition may be set.

A matrix Y may be determined by multiplying a transposed-matrix A by a matrix X. For example, Y=A^T×X may be set. Also, a result obtained by adding w4 to each element in the matrix Y may be expressed in the form of a natural binary, and the device 10 may obtain a result of transformation by right shifting the result expressed in the form of a natural binary by s4-bit. Here, A may be an N×N transform matrix determined by the aforementioned methods. Also, in the present embodiment, a condition in which N and L have a same value, w4 and s4 are integers, and w4≥0, s4≥0 may be satisfied. Here, the condition may be an example, and another condition may be set.

Figure 2:
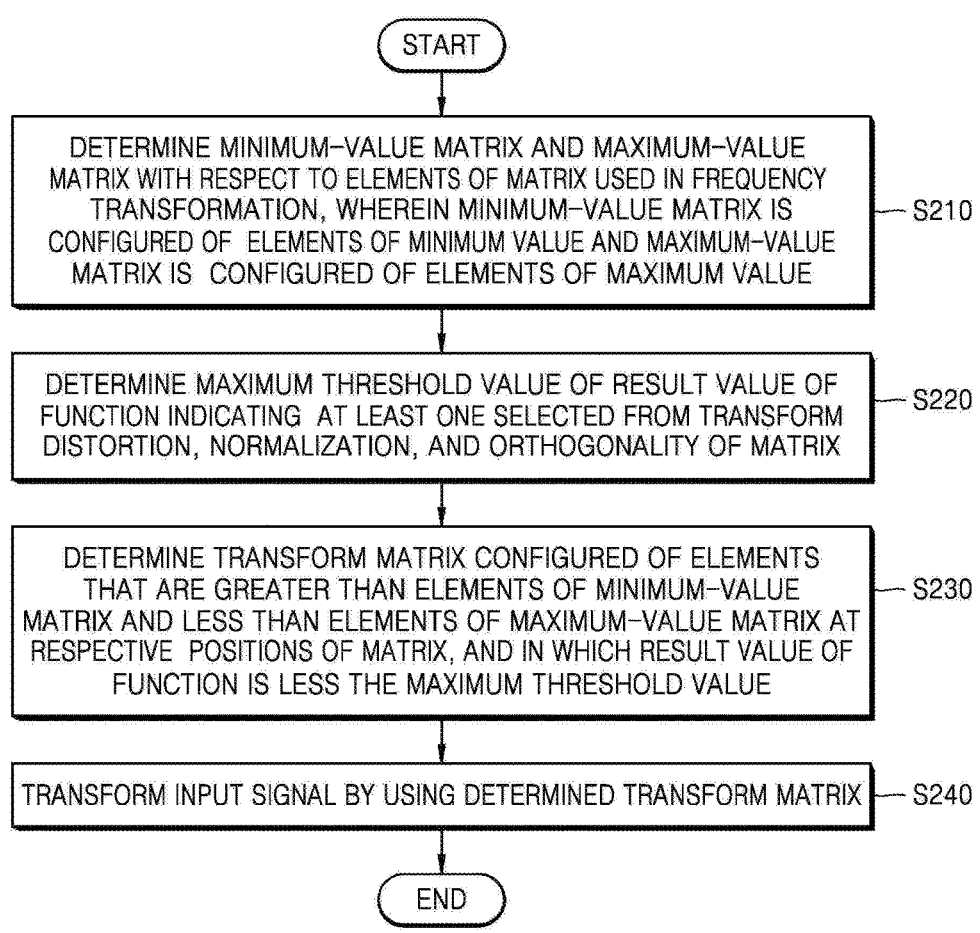
FIG. 2 illustrates a flowchart for describing a method of determining a transform matrix, and transforming an input signal by using the transform matrix, according to various embodiments.

FIG. 2 illustrates a flowchart for describing a method of determining a transform matrix, and transforming an input signal by using the transform matrix, according to various embodiments.

In operation S210, the device 10 may determine a minimum-value matrix and a maximum-value matrix with respect to elements of a matrix used in frequency transformation, wherein the minimum-value matrix is configured of the elements of minimum value and the maximum-value matrix is configured of the elements of maximum value.

"[DCT(i,j)×Factor]−2" described in the aforementioned formula (3) may be an element of the minimum-value matrix.

Also, "[DCT(i,j)×Factor]+2" described in the aforementioned formula (3) may be an element of the maximum-value matrix.

Therefore, the device 10 may determine a minimum-value matrix and a maximum-value matrix with respect to a transform matrix used in a DCT transform.

In operation S220, the device 10 may determine a maximum threshold value of a result value of a function indicating at least one selected from transform distortion, normalization, and orthogonality of the matrix.

In an example of determining the result value of the function, a result value of a function indicating at least one selected from transform distortion, normalization, and orthogonality of a transform matrix A, may be determined by applying the transform matrix A to formula (5). Here, a value of J(A) may be the result value of the function.

In an example of determining the maximum threshold value, when "[DCT(i,j)×Factor]" described in the aforementioned formula (3) is a value of M(i,j), a value of J(M) obtained according to formula (7) may be the maximum threshold value of the transform matrix A.

Also, in an embodiment, when the maximum threshold value is TH, the transform matrix A may satisfy the aforementioned formula (4). In order to determine J(A), formula (5) and formula (6) may be used.

In operation S230, the device 10 may determine a transform matrix configured of elements that are greater than the elements of the minimum-value matrix and are less than the elements of the maximum-value matrix at respective positions of the matrix, and in which the result value of the function is less than the maximum threshold value.

For example, the transform matrix A may satisfy the aforementioned formulas (3) and (4). An example of the transform matrix A that satisfies the aforementioned formulas (3) and (4) is described at a later time with reference to FIG. 6.

In operation S240, the device 10 may transform an input signal by using the determined transform matrix.

For example, by multiplying a matrix corresponding to the input signal by the transform matrix A, a matrix corresponding to an output signal may be obtained.

As another example, by multiplying the transform matrix A by the matrix corresponding to the input signal, a matrix corresponding to an output signal may be obtained.

As another example, by multiplying the matrix corresponding to the input signal by a transposed-transform matrix A, a matrix corresponding to an output signal may be obtained.

As another example, by multiplying the transposed-transform matrix A by the matrix corresponding to the input signal, a matrix corresponding to an output signal may be obtained.

Figure 3:
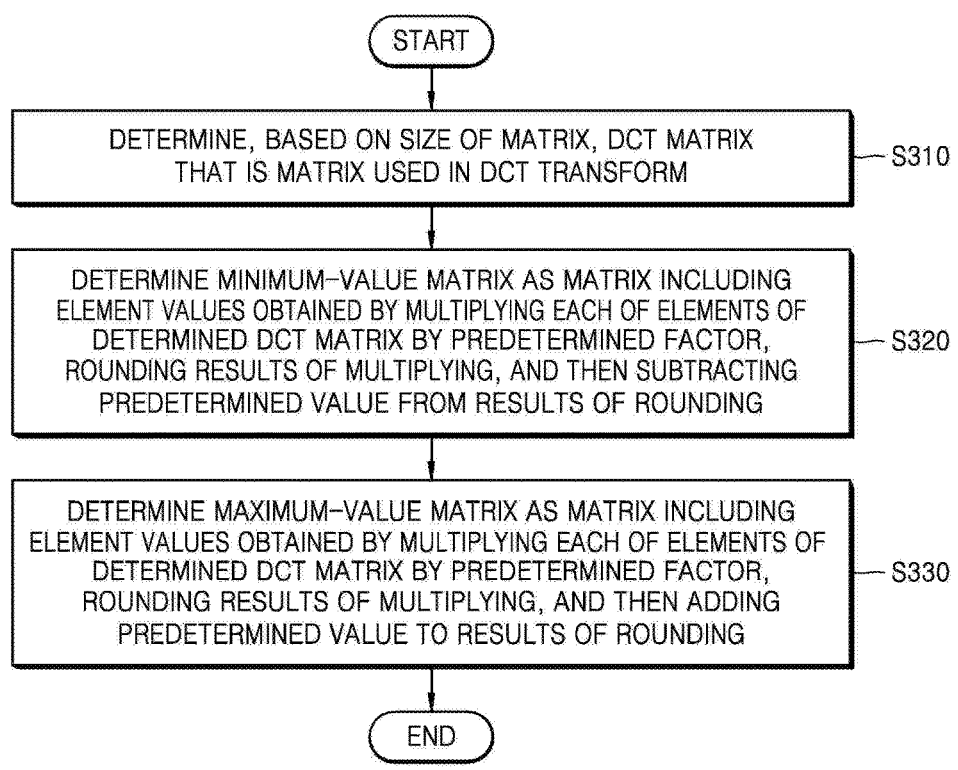
FIG. 3 illustrates a flowchart for describing a method of determining a minimum-value matrix and a maximum-value matrix by using a DCT matrix, according to various embodiments.

FIG. 3 illustrates a flowchart for describing a method of determining a minimum-value matrix and a maximum-value matrix by using a DCT matrix, according to various embodiments.

In operation S310, the device 10 may determine, based on a size of a matrix, the DCT matrix that is a matrix used in a DCT transform. The DCT matrix may include elements of irrational value.

The DCT matrix may be the matrix used when the DCT transform is performed. Also, the DCT matrix may include the irrational elements. Also, as described above, the DCT matrix may be determined by using formula (2).

In addition, the device 10 may use a size of a transform matrix so as to determine the DCT matrix. For example, when a value of N in formula (2) which is the size of the transform matrix is determined, the device 10 may determine values of the elements of the DCT matrix.

In operation S320, the device 10 may determine a minimum-value matrix as a matrix including element values obtained by multiplying each of the elements of the DCT matrix by a predetermined factor, rounding results of the multiplying, and then subtracting a predetermined value from results of the rounding, wherein the elements of the DCT matrix are determined in operation S310.

For example, "[DCT(i,j)×Factor]−2" described in formula (3) may be an element of the minimum-value matrix. For example, the device 10 may determine the minimum-value matrix as a matrix including element values obtained by multiplying each of the elements of the DCT matrix by a predetermined factor, rounding multiplication results, and then subtracting 2 from the results of the rounding.

As another example, the device 10 may determine the minimum-value matrix as a matrix including elements obtained through "[DCT(i,j)×3]−7".

In operation S330, the device 10 may determine a maximum-value matrix as a matrix including element values obtained by multiplying each of the elements of the DCT matrix by a predetermined factor, rounding the results of the multiplying, and then adding a predetermined value to the results of the rounding, wherein the elements of the DCT matrix are determined in operation S310.

As another example, the device 10 may determine the maximum-value matrix as a matrix including elements obtained through "[DCT(i,j)×3]+7".

Figure 4A:
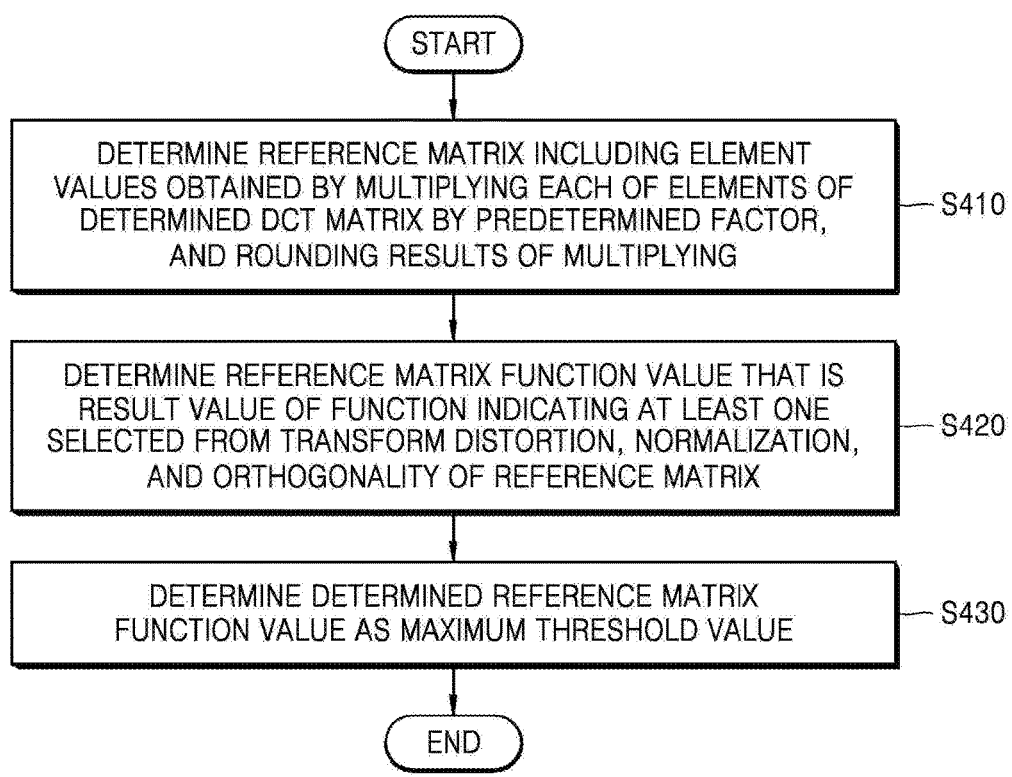
FIG. 4A illustrates a flowchart for describing a method of determining a maximum threshold value by using a reference matrix, according to various embodiments.

FIG. 4A illustrates a flowchart for describing a method of determining a maximum threshold value by using a reference matrix, according to various embodiments.

In operation S410, the device 10 may determine a reference matrix including element values obtained by multiplying each of elements of a determined DCT matrix by a predetermined factor, and rounding results of the multiplying.

For example, the reference matrix may indicate a matrix obtained by multiplying the DCT matrix including irrational elements by the predetermined factor and rounding each of the elements in calculation results. For example, the reference matrix may indicate the matrix M. For example, [DCT(i,j)×Factor] may be an element of the matrix M.

In operation S420, the device 10 may determine a reference matrix function value that is a result value of a function indicating at least one selected from transform distortion, normalization, and orthogonality of the reference matrix.

For example, J(M) in the aforementioned formula (7) may represent the reference matrix function value.

Also, the reference matrix function value may be a rate-distortion cost. For example, J(M) in the aforementioned formula (7) may represent a rate-distortion cost of the reference matrix.

As another example, a rate-distortion cost of the reference matrix which is obtained by using a general rate-distortion cost calculating method may be the reference matrix function value.

In operation S430, the device 10 may determine, as the maximum threshold value, the reference matrix function value which is determined in operation S420.

For example, the device 10 may determine, as the maximum threshold value, a value of J(M) in the aforementioned formula (7).

As another example, the device 10 may determine, as the maximum threshold value, a value of the rate-distortion cost obtained by using the general rate-distortion cost calculating method.

Although not illustrated in FIG. 4, the maximum threshold value may be preset as a predetermined value. For example, the maximum threshold value may be preset as 0.2. As another example, the maximum threshold value may be preset as a predetermined value that is determined by using a preset variable. For example, when a matrix used in frequency transform is N×N, the maximum threshold value may be N×0.02.

Figure 4B:
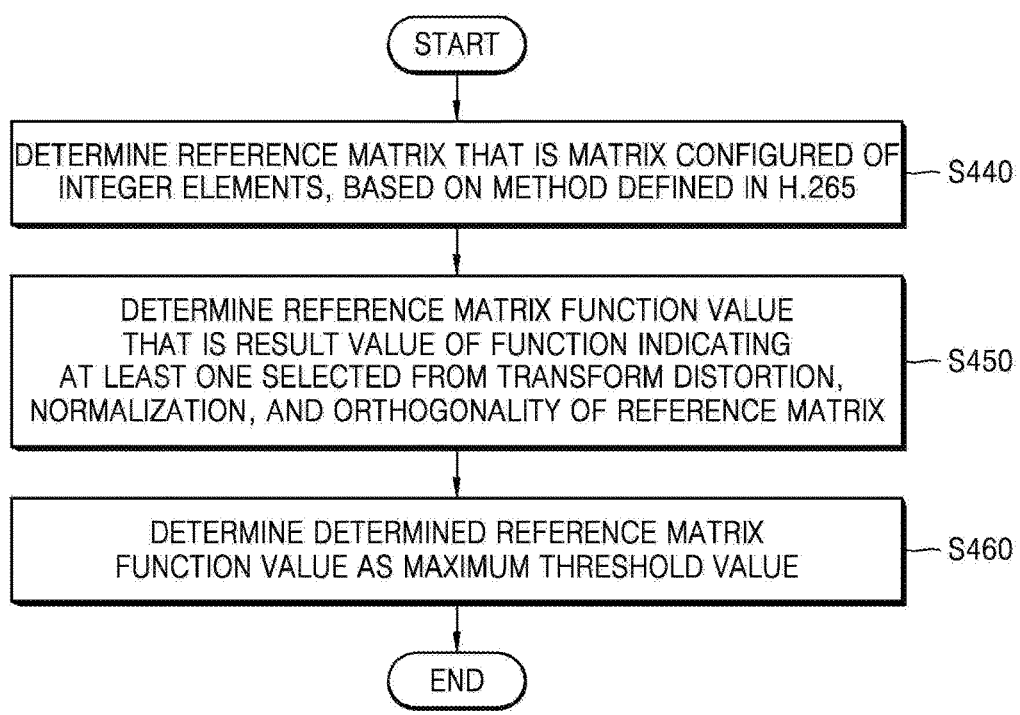
FIG. 4B illustrates a flowchart for describing a method of determining a maximum threshold value by using a scheme defined in H.265, according to various embodiments.

FIG. 4B illustrates a flowchart for describing a method of determining a maximum threshold value by using a method defined in H.265, according to various embodiments.

In operation S440, the device 10 may determine a reference matrix that is a matrix configured of integer elements, based on the method defined in H.265.

For example, a reference matrix determining method may be defined in H.265, and the device 10 may determine the reference matrix, according to the reference matrix determining method defined in H.265. In addition, an element of the reference matrix may be an integer.

Operations S450 and S460 correspond to operations S420 and S430, respectively, thus, detailed descriptions thereof are omitted here to make an overall description simple.

Figure 5:
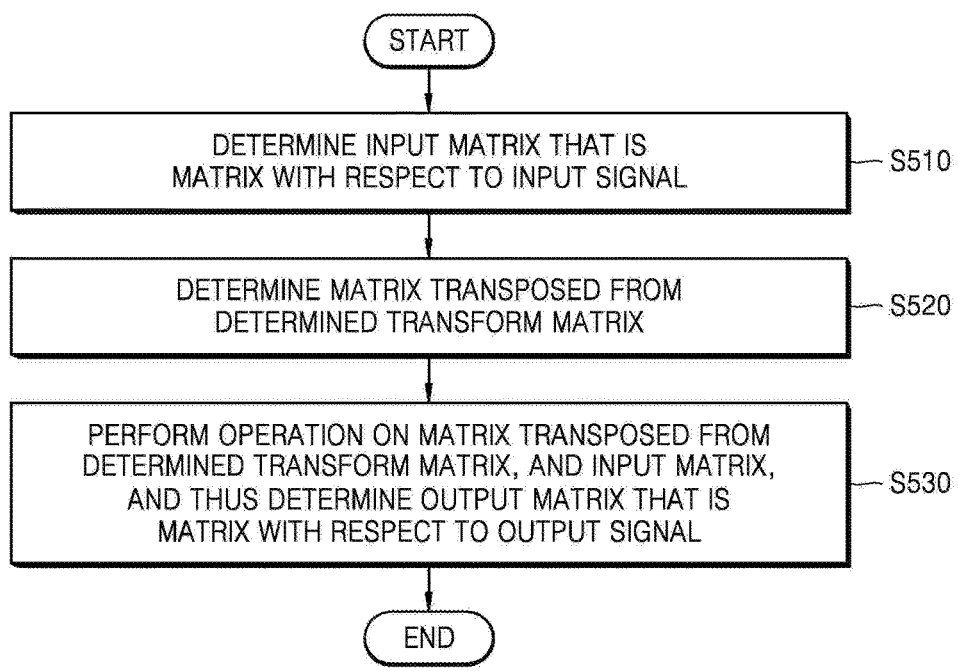
FIG. 5 illustrates a flowchart for describing a method of determining an output matrix that is a matrix with respect to an output signal, according to various embodiments.

FIG. 5 illustrates a flowchart for describing a method of determining an output matrix that is a matrix with respect to an output signal, according to various embodiments.

In operation S510, the device 10 may determine an input matrix that is a matrix with respect to an input signal.

For example, the device 10 may express the input signal in a matrix form, and the matrix expressed in a matrix form, from the input signal, by the device 10, may be the input matrix.

In operation S520, the device 10 may determine a matrix transposed from a transform matrix determined by using a predetermined method.

The transpose may indicate a type of an operation of switching a row and a column. If it is assumed that a transform matrix is a matrix A, the transposed matrix A may be expressed as A^T.

In operation S530, the device 10 may perform an operation on the transposed matrix, which is determined in operation S520, and the input matrix, and thus may determine the output matrix that is the matrix with respect to the output signal.

For example, it may be assumed that the transform matrix is the matrix A, the input matrix is a matrix X, and the output matrix is a matrix Y.

In an example of determining the output matrix, the matrix Y may be determined by multiplying the matrix A by the matrix X. For example, Y=A×X may be set. Also, a result obtained by adding w1 to each element in the matrix Y may be expressed in the form of a natural binary, and the device 10 may obtain a result of transformation by right shifting the result expressed in the form of a natural binary by s1-bit. Here, A may be an N×N transform matrix determined by the aforementioned methods. Also, in the present embodiment, a condition in which N and L have a same value, w1 and s1 are integers, and w1≥0, s1≥0 may be satisfied. Here, the condition may be an example, and another condition may be set.

In another example of determining the output matrix, the matrix Y may be determined by multiplying the matrix X by a transposed-matrix A. For example, Y=X×A^T may be set. Also, a result obtained by adding w2 to each element in the matrix Y may be expressed in the form of a natural binary, and the device 10 may obtain a result of transformation by right shifting the result expressed in the form of a natural binary by s2-bit. Here, A may be an N×N transform matrix determined by the aforementioned methods. Also, in the present embodiment, a condition in which N and K have a same value, w2 and s2 are integers, and w2≥0, s2≥0 may be satisfied. Here, the condition may be an example, and another condition may be set.

In another example of determining the output matrix, the matrix Y may be determined by multiplying a matrix X by a matrix A. For example, Y=X×A may be set. Also, a result obtained by adding w3 to each element in the matrix Y may be expressed in the form of a natural binary, and the device 10 may obtain a result of transformation by right shifting the result expressed in the form of a natural binary by s3-bit. Here, A may be an N×N transform matrix determined by the aforementioned methods. Also, in the present embodiment, a condition in which N and K have a same value, w3 and s3 are integers, and w3≥0, s3≥0 may be satisfied. Here, the condition may be an example, and another condition may be set.

In another example of determining the output matrix, the matrix Y may be determined by multiplying a transposed-matrix A by a matrix X. For example, Y=A^T×X may be set. Also, a result obtained by adding w4 to each element in the matrix Y may be expressed in the form of a natural binary, and the device 10 may obtain a result of transformation by right shifting the result expressed in the form of a natural binary by s4-bit. Here, A may be an N×N transform matrix determined by the aforementioned methods. Also, in the present embodiment, a condition in which N and L have a same value, w4 and s4 are integers, and w4≥0, s4≥0 may be satisfied. Here, the condition may be an example, and another condition may be set.

With reference to FIGS. 6A through 6N, various embodiments are described in detail.

FIG. 6 illustrates diagrams for describing a method of determining a matrix M that is a reference matrix and a matrix A that is a transform matrix, according to various embodiments.

FIGS. 6A and 6B illustrate diagrams for describing a method of determining a matrix M that is a reference matrix and a matrix A that is a transform matrix, according to various embodiments.

FIGS. 6A and 6B illustrate a first embodiment.

While an actual 8×8 transform process is performed, implementation of the transform may satisfy requirements. Each of coefficients in the transform matrix A may be an integer and a storage space of each coefficient may not exceed 9 bits. For example, formula (9) may be satisfied.

$$\text{Factor} = 256\sqrt{2} \qquad \text{[formula (9)]}$$

For example, α=3, β=γ=0. Also, the transform matrix A may satisfy the aforementioned formulas (3) and (4).

TH that is a maximum threshold value may be obtained by using a method below.

When a condition of formula (9) is satisfied, the matrix M may be obtained by performing rounding according to formula (1), and FIG. 6A illustrates an example of the matrix X.

When the matrix M is as shown in FIG. 6A, J(M)=0.015159 may be confirmed via calculation. TH that is the maximum threshold value may be set as J(M).

The transform matrix A may be written as a member of a set. For example, A may satisfy A∈{S:J(S)<0.015159} and the aforementioned formula (3). A finite number of the transform matrix may be limitedly obtained. FIG. 6B illustrates an example of the transform matrix A.

When the matrix A is as shown in FIG. 6B, J(A)=0.014621 may be confirmed via calculation.

Figure 6C:
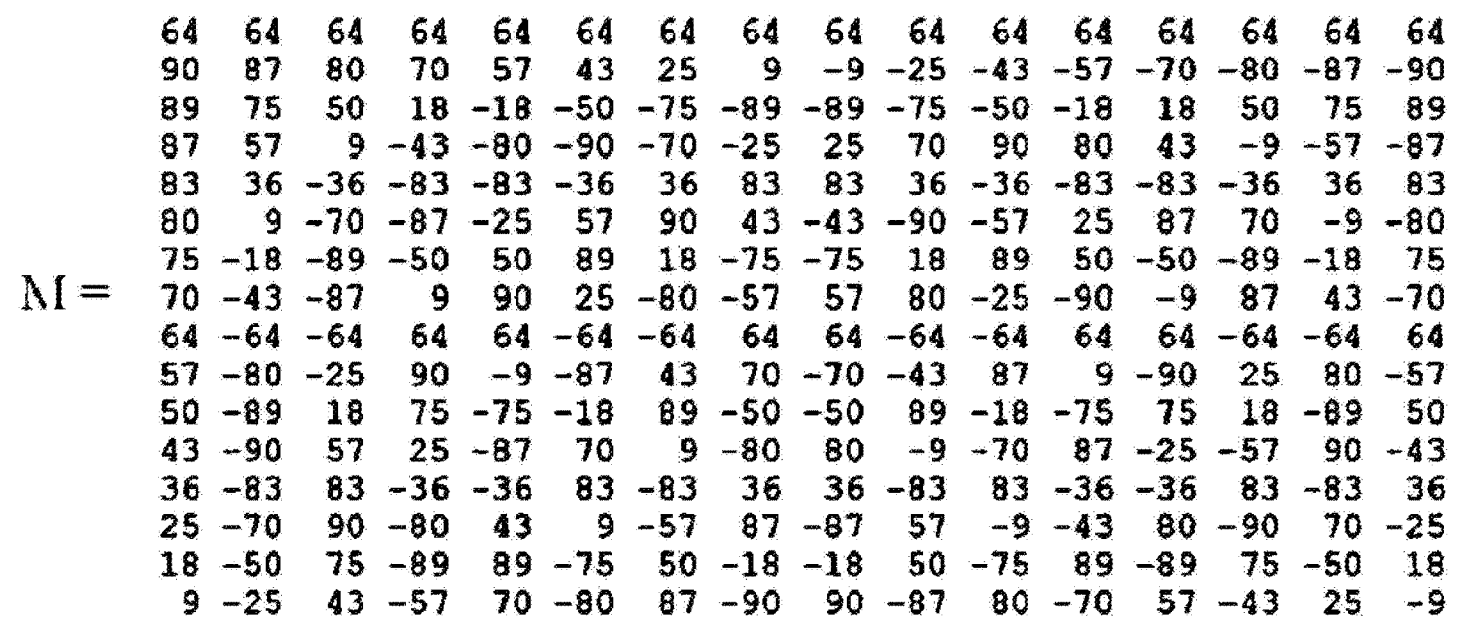

FIGS. 6C and 6D illustrate diagrams for describing a method of determining a matrix M that is a reference matrix and a matrix A that is a transform matrix, according to various embodiments.

FIGS. 6C and 6D illustrate a second embodiment.

While an actual 16×16 transformation process is performed, implementation of the transformation may satisfy requirements. Each of coefficients in the transform matrix A may be an integer and a storage space of each coefficient may not exceed 8 bits. For example, formula (10) may be satisfied.

Factor=256 [formula (10)]

For example, $\alpha=2$, $\beta=\gamma=1$. Also, the transform matrix A may satisfy the aforementioned formulas (3) and (4).

TH that is a maximum threshold value may be obtained by using a method below.

A matrix M may be a 16×16 transform matrix defined in the H.265 standard, and FIG. 6A illustrates an example of the matrix M.

When the matrix M is as shown in FIG. 6C, J(M)=0.13377 may be confirmed via calculation. TH that is the maximum threshold value may be set as J(M).

The transform matrix A may be written as a member of a set. For example, A may satisfy $A \in \{S:J(S)<0.13377\}$ and the aforementioned formula (3). A finite number of the transform matrix may be limitedly obtained. FIG. 6D illustrates an example of the transform matrix A.

When the matrix A is as shown in FIG. 6D, J(A)=0.080737 may be confirmed via calculation.

FIGS. 6E and 6F illustrate diagrams for describing a method of determining a matrix M that is a reference matrix and a matrix A that is a transform matrix, according to various embodiments.

FIGS. 6E and 6F illustrate a third embodiment.

While an actual 8×8 transform process is performed, implementation of the transform may satisfy requirements. Each of coefficients in the transform matrix A may be an integer and a storage space of each coefficient may not exceed 8 bits. For example, formula (11) may be satisfied.

Factor=128$\sqrt{2}$ [formula (11)]

For example, $\alpha=2$, $\beta=\gamma=1$. Also, the transform matrix A may satisfy the aforementioned formulas (3) and (4).

TH that is a maximum threshold value may be obtained by using a method below.

The matrix M may be an 8×8 transform matrix defined in the H.265 standard, and FIG. 9A illustrates an example of the matrix M.

When the matrix M is as shown in FIG. 6E, J(M)=0.038484 may be confirmed via calculation. TH that is the maximum threshold value may be set as J(M).

The transform matrix A may be written as a member of a set. For example, A may satisfy $A \in \{S:J(S)<0.038484\}$ and the aforementioned formula (3). A finite number of the transform matrix may be limitedly obtained. FIG. 6F illustrates an example of the transform matrix A.

When the matrix A is as shown in FIG. 6F, J(A)=0.02687 may be confirmed via calculation.

FIGS. 6G and 6H illustrate diagrams for describing a method of determining a matrix M that is a reference matrix and a matrix A that is a transform matrix, according to various embodiments.

FIGS. 6G and 6H illustrate a fourth embodiment.

While an actual 4×4 transform process is performed, implementation of the transform may satisfy requirements. Each of coefficients in the transform matrix A may be an integer and a storage space of each coefficient may not exceed 8 bits. For example, formula (12) may be satisfied.

Factor=128 [formula (12)]

For example, $\alpha=4$, $\beta=\gamma=1$. Also, the transform matrix A may satisfy the aforementioned formulas (3) and (4).

TH that is a maximum threshold value may be obtained by using a method below.

The matrix M may be a 4×4 transform matrix defined in the H.265 standard, and FIG. 10A illustrates an example of the matrix M.

When the matrix M is as shown in FIG. 6G, J(M)=0.022349 may be confirmed via calculation. TH that is the maximum threshold value may be set as J(M).

The transform matrix A may be written as a member of a set. For example, A may satisfy $A \in \{S:J(S)<0.022349\}$ and the aforementioned formula (3). A finite number of the transform matrix may be limitedly obtained. FIG. 6H illustrates an example of the transform matrix A.

When the matrix A is as shown in FIG. 6H, J(A)=0.006411 may be confirmed via calculation.

FIGS. 6I and 6J illustrate diagrams for describing a method of determining a matrix M that is a reference matrix and a matrix A that is a transform matrix, according to various embodiments.

FIGS. 6I and 6J illustrate a fifth embodiment.

While an actual 8×8 transform process is performed, implementation of the transform may satisfy requirements. Each of coefficients in the transform matrix A may be an integer and a storage space of each coefficient may not exceed 7 bits. For example, formula (13) may be satisfied.

Factor=64$\sqrt{2}$ [formula (13)]

For example, $\alpha=5$, $\beta=1.5$, $\gamma=1$. Also, the transform matrix A may satisfy the aforementioned formulas (3) and (4).

TH that is a maximum threshold value may be obtained by using a method below.

The matrix M may be an 8×8 transform matrix defined in RD 3.0 that is reference software of AVS2, and FIG. 6I illustrates an example of the matrix M.

When the matrix M is as shown in FIG. 6I, J(M)=0.068060 may be confirmed via calculation. TH that is the maximum threshold value may be set as J(M).

The transform matrix A may be written as a member of a set. For example, A may satisfy $A \in \{S:J(S)<0.068060\}$ and the aforementioned formula (3). A finite number of the transform matrix may be limitedly obtained. FIG. 6J illustrates an example of the transform matrix A.

When the matrix A is as shown in FIG. 6J, J(A)=0.055759 may be confirmed via calculation.

Figure 6K:
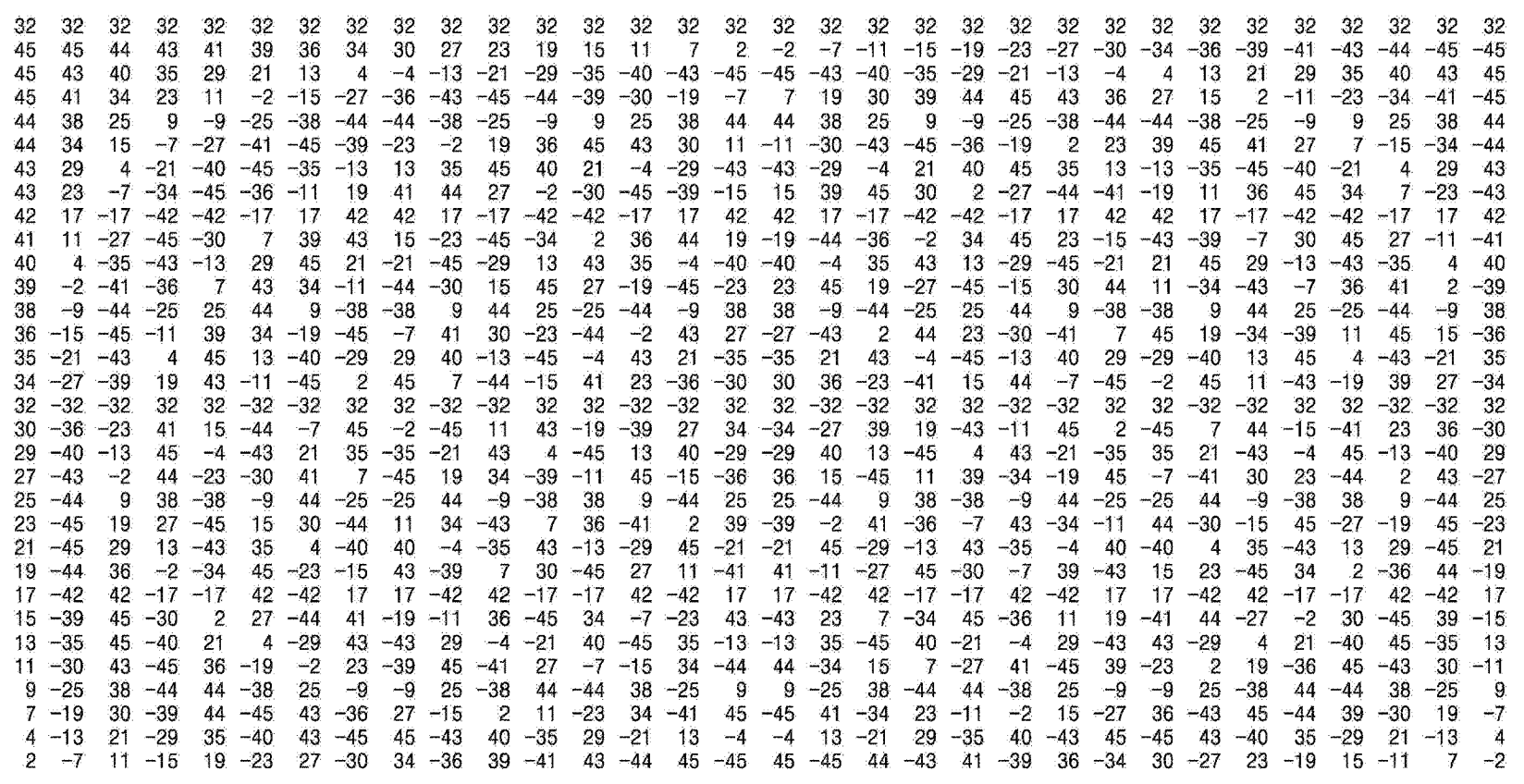

FIG. 6K illustrates a diagram for describing a method of determining a matrix A that is a transform matrix, according to various embodiments.

FIG. 6K illustrates a sixth embodiment.

While an actual 32×32 transform process is performed, implementation of the transform may satisfy requirements. Each of coefficients in the transform matrix A may be an integer and a storage space of each coefficient may not exceed 7 bits. For example, formula (11) may be satisfied. For example, Factor=128$\sqrt{2}$.

For example, $\alpha=2$, $\beta=1.5$, $\gamma=1$. Also, the transform matrix A may satisfy the aforementioned formulas (3) and (4).

TH that is a maximum threshold value may be 32×0.02=0.64.

The transform matrix A may be written as a member of a set. For example, A may satisfy A∈{S:J(S)<0.64} and the aforementioned formula (3). A finite number of the transform matrix may be limitedly obtained. FIG. 6K illustrates an example of the 32×32 transform matrix A, when J(A)= 0.437463.

Figure 6L:
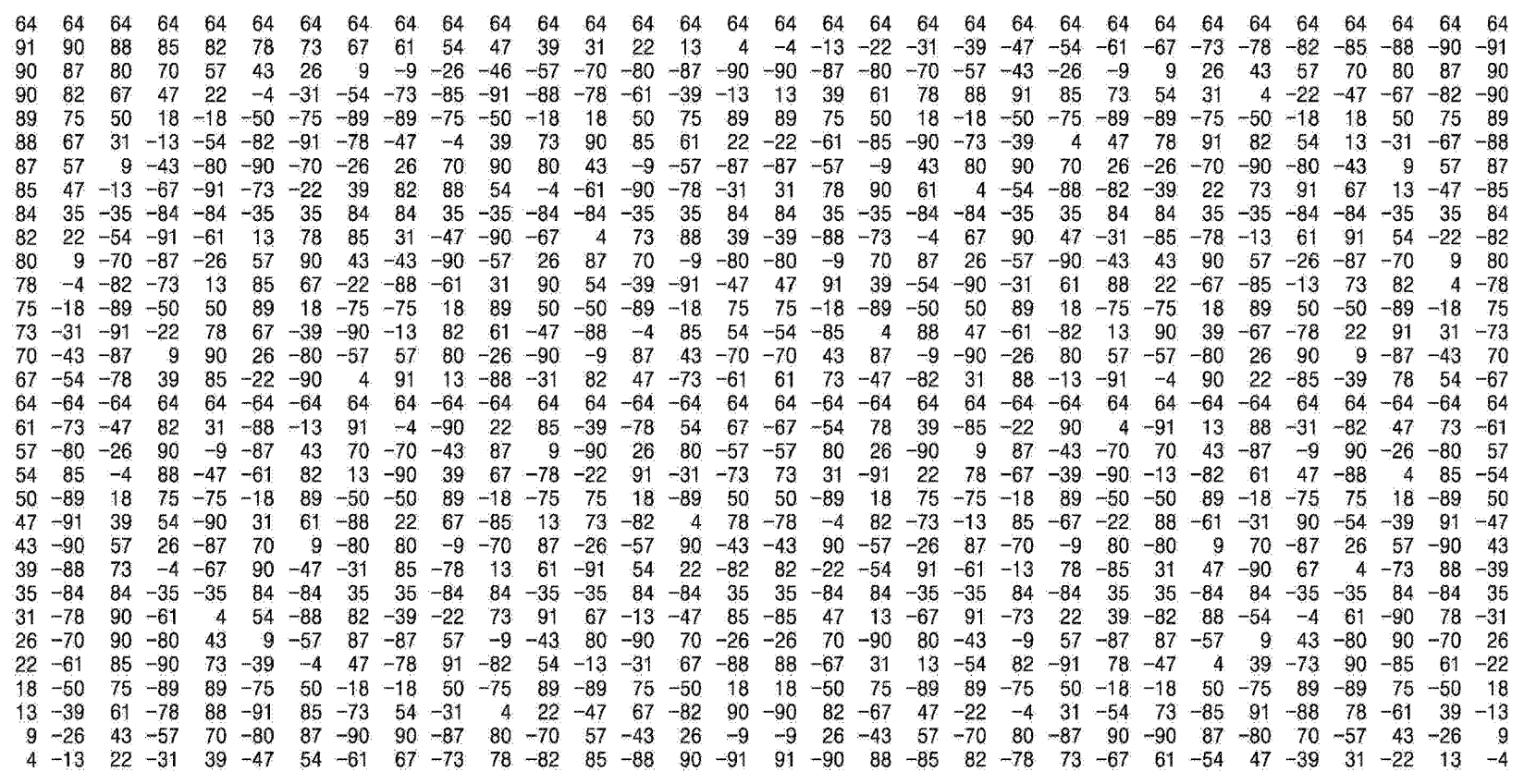
Figure 6N:
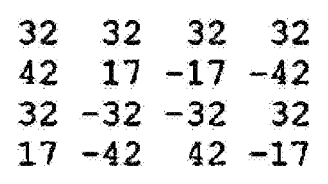

FIG. 6L illustrates a diagram for describing a method of determining a matrix A that is a transform matrix, according to various embodiments.

FIG. 6L illustrates a seventh embodiment.

While an actual 32×32 transform process is performed, implementation of the transform may satisfy requirements. Each of coefficients in the transform matrix A may be an integer and a storage space of each coefficient may not exceed 8 bits. For example, formula (9) may be satisfied. For example, Factor=256√2.

For example, $\alpha=6$, $\beta=1$, $\gamma=1.5$. Also, the transform matrix A may satisfy the aforementioned formula (3) and J(A)≤TH.

TH that is a maximum threshold value may be 32×0.02=0.64.

The transform matrix A may be written as a member of a set. For example, A may satisfy A∈{S:J(S)<0.64} and the aforementioned formula (3). A finite number of the transform matrix may be limitedly obtained. FIG. 6L illustrates an example of the 32×32 transform matrix A, when J(A)= 0.271159.

FIG. 6M illustrates a diagram for describing a method of determining a matrix A that is a transform matrix, according to various embodiments.

FIG. 6M illustrates an eighth embodiment.

While an actual 16×16 transform process is performed, implementation of the transform may satisfy requirements. Each of coefficients in the transform matrix A may be an integer and a storage space of each coefficient may not exceed 7 bits. For example, formula (12) may be satisfied. For example, a predetermined factor=128.

For example, $\alpha=3$, $\beta=1$, $\gamma=1$. Also, the transform matrix A may satisfy the aforementioned formula (3) and J(A)<TH.

TH that is a maximum threshold value may be 16×0.02=0.32.

The transform matrix A may be written as a member of a set. For example, A may satisfy A∈{S:J(S)<0.32} and the aforementioned formula (3). A finite number of the transform matrix may be limitedly obtained. FIG. 6M illustrates an example of the 16×16 transform matrix A, when J(A)= 0.158616.

FIG. 6N illustrates a diagram for describing a method of determining a matrix A that is a transform matrix, according to various embodiments.

FIG. 6N illustrates a ninth embodiment.

While an actual 4×4 transform process is performed, implementation of the transform may satisfy requirements. Each of coefficients in the transform matrix A may be an integer and a storage space of each coefficient may not exceed 7 bits. For example, a predetermined factor=64.

For example, $\alpha=3$, $\beta=1$, $\gamma=1$. Also, the transform matrix A may satisfy the aforementioned formula (3) and J(A)≤TH.

TH that is a maximum threshold value may be 4×0.02=0.08.

The transform matrix A may be written as a member of a set. For example, A may satisfy A∈{S:J(S)<0.08} and the aforementioned formula (3). A finite number of the transform matrix may be limitedly obtained. FIG. 6N illustrates an example of the 4×4 transform matrix A, when J(A)= 0.01069.

A tenth embodiment is described below.

During an actual transform process, a size of a transformation target data block X may be 16×16 and a data bit-width of the data block X may be n-bit. A transform matrix A may be a 16×16 matrix that satisfies a condition of J(A)<TH described in the second embodiment. In this case, it may be required that a data bit-width of a transformed data block Y does not exceed r-bit. The transform process is described below.

A matrix Y may be determined by multiplying a matrix A by a matrix X. For example, Y=A×X may be set. Also, a result obtained by adding w to each element in the matrix Y may be expressed in the form of a natural binary, and the device 10 may obtain a result of transformation by right shifting the result expressed in the form of a natural binary by s-bit. Also, s=n+10-r where s may be greater than or equal to 0. Here, the condition may be an example, and another condition may be set.

When s=0, w=0. When s>0, w may be obtained by left shifting 1 by (s−1)-bit, in which 1 is expressed in the form of a natural binary.

The transform process Y=A×X may be expressed by matrix multiplication, while in practice, the matrix multiplication may be implemented with a butterfly structure.

An eleventh embodiment is described below.

During an actual transform process, a size of a transformation target data block X may be 32×8 and a data bit-width of the data block X may be n-bit. A transform matrix A may be an 8×8 matrix that satisfies a condition of J(A)<TH described in the first embodiment. In this case, it may be required that a data bit-width of a transformed data block Y does not exceed r-bit. The transform process is described below.

A matrix Y may be determined by multiplying a matrix X by a transposed-matrix A. For example, Y=X×A^T may be set. In order to obtain a result, w may be added to each element of the matrix Y. The result expressed in the form of a natural binary may be shifted right by s-bit so as to obtain a result of transformation. Also, s=n+10-r where s may be greater than or equal to 0. Here, the condition may be an example, and another condition may be set.

When s<0, w=0. When s≥0, w may be obtained by left shifting 1 by (s−2)-bit, in which 1 is expressed in the form of a natural binary.

The transform process Y=X×A^T may be expressed by matrix multiplication, while in practice, the matrix multiplication may be implemented with a butterfly structure.

A twelfth embodiment is described below.

During an actual transform process, a size of a transformation target data block X may be 32×4 and a data bit-width of the data block X may be n-bit. A transform matrix A may be a 4×4 matrix that satisfies a condition of J(A)<TH described in the fourth embodiment. In this case, it may be required that a data bit-width of a transformed data block Y does not exceed r-bit. The transform process is described below.

A matrix Y may be determined by multiplying a matrix X by a matrix A. For example, Y=X×A may be set. In order to obtain a result, w may be added to each element of the matrix Y. The result expressed in the form of a natural binary may be shifted right by s-bit so as to obtain a result of transformation. Also, s=n+7−r where s may be greater than or equal to 0. Here, the condition may be an example, and another condition may be set.

w may be obtained by rounding a result obtained by left shifting 1 by s-bit and then being divided by 3, in which 1 is expressed in the form of a natural binary.

The transform process Y=X×A may be expressed by matrix multiplication, while in practice, the matrix multiplication may be implemented with a butterfly structure.

A thirteenth embodiment is described below.

During an actual transform process, a size of a transformation target data block X may be 32×8 and a data bit-width of the data block X may be n-bit. A transform matrix A may be a 32×32 matrix that satisfies a condition of J(A)<TH described in the sixth embodiment. In this case, it may be required that a data bit-width of a transformed data block Y does not exceed r-bit. The transform process is described below.

A matrix Y may be determined by multiplying a transposed-matrix A by a matrix X. For example, Y=A^T×X may be set. In order to obtain a result, w may be added to each element of the matrix Y. The result expressed in the form of a natural binary may be shifted right by s-bit so as to obtain a result of transformation. Also, s=n+6−r where s may be greater than or equal to 0. Here, the condition may be an example, and another condition may be set.

w may be obtained by rounding a result obtained by left shifting 1 by s-bit and then being divided by 6, in which 1 is expressed in the form of a natural binary.

The transform process Y=A^T×X may be expressed by matrix multiplication, while in practice, the matrix multiplication may be implemented with a butterfly structure.

A fourteenth embodiment is described below.

In video image coding, when a reconstructed residual is used during a reconstruction process of an image, a bit-width of the reconstructed residual may be n-bit. It may be required that a bit-width of intermediate data does not exceed r-bit during a transformation process. For an N×N block, a corresponding reconstructed residual block may be C that is obtained by performing two-dimensional N×N inverse transform to an inverse-quantized coefficient block X (a data bit-width of the block X may be s0). As described in the aforementioned embodiments, the transform matrix that satisfies J(A)<TH may be the matrix A. The inverse-transform may include following operations.

In operation 1, a first-dimensional inverse-transform may be performed on X so as to obtain a result, and then the result may be shifted right by s1-bit so as to obtain Y1.

For example, formula (14) may be satisfied.

$$Y1=(X \times A+(1<<(s1-1)))>>s1 \qquad \text{[formula (14)]}$$

Hereinafter, the meaning of formula (14) is described. In Y=X×A, w1 may be added to each element in a matrix Y so as to obtain a result, and the result that is expressed in the form of a natural binary may be shifted right by s1-bit so as to obtain a transform result Y1. When s1=0, w1=0, and when s1>0, w1 may be a result obtained by left shifting 1 by (s1−1)-bit, in which 1 is expressed in the form of a natural binary.

The transform process Y=X×A may be expressed by matrix multiplication, while in practice, the matrix multiplication may be implemented with a butterfly structure.

In operation 2, a second-dimensional inverse transform may be performed on Y1 so as to obtain a result, and then the result may be shifted right by s2-bit so as to obtain C.

For example, formula (15) may be satisfied.

$$C=(A^T \times Y1+(1<<(s2-1)))>>s2 \qquad \text{[formula (15)]}$$

Hereinafter, the meaning of formula (15) is described. In Y=A^T×Y1, w2 may be added to each element in a matrix Y so as to obtain a result, and the result that is expressed in the form of a natural binary may be shifted right by s1-bit so as to obtain a transform result C. When s2=0, w2=0, and when s2>0, w2 may be a result obtained by left shifting 1 by (s1−1)-bit, in which 1 is expressed in the form of a natural binary.

The transform process Y=A^T×Y1 may be expressed by matrix multiplication, while in practice, the matrix multiplication may be implemented with a butterfly structure.

An intermediate value m may be defined by using formula (16).

$$m=\log_2(\text{Factor}/\sqrt{N}) \qquad \text{[formula (16)]}$$

In a limitation condition of a transform matrix A, values of s1 and s2 may satisfy s1=s0+M−r, s2=r+m−n, s1≥0 and s2≥0.

During the process described above, the symbol "<<" may indicate to left shift data that is expressed in the form of a natural binary, and the symbol ">>" may indicate to right shift data that is expressed in the form of a natural binary.

A fifteenth embodiment is described below.

In video image coding, a prediction residual may be obtained when prediction coding is performed on pixels. A bit-width of the prediction residual may be n-bit. It may be required that a bit-width of intermediate data during the transform process does not exceed r-bit. A two-dimensional N×N forward transform may be performed on an N×N residual block X. As described in the aforementioned embodiments, a transform matrix that satisfies J(A)<TH may be the matrix A. The transform may include following operations.

In operation 1, a first-dimensional forward-transform may be performed on X so as to obtain a result, and then the result may be shifted right by s1-bit so as to obtain Y1.

For example, formula (17) may be satisfied.

$$Y1=(X \times A+(1<<(s1-2)))>>s1 \qquad \text{[formula (17)]}$$

Hereinafter, the meaning of formula (17) is described. In Y=X×A, w1 may be added to each element in a matrix Y so as to obtain a result, and the result that is expressed in the form of a natural binary may be shifted right by s1-bit so as to obtain a transform result Y1. When S1<2, w1=0, and when s1≥2, w1 may be a result obtained by left shifting 1 by (s1−2)-bit, in which 1 is expressed in the form of a natural binary.

The transform process Y=X×A may be expressed by matrix multiplication, while in practice, the matrix multiplication may be implemented with a butterfly structure.

In operation 2, a second-dimensional forward transform may be performed on Y1 so as to obtain a result, and then the result may be shifted right by s2-bit so as to obtain Y2.

For example, formula (18) may be satisfied.

$$Y2=(Y1 \times A^T+(1<<(s2-1)))>>s2 \qquad \text{[formula (18)]}$$

Hereinafter, the meaning of formula (18) is described. In Y=Y1×A^T, w2 may be added to each element in a matrix Y so as to obtain a result, and the result that is expressed in the form of a natural binary may be shifted right by s1-bit so as to obtain a transform result Y2. When s2=0, w2=0, and when s2>0, w2 may be a result obtained by left shifting 1 by (s2−1)-bit, in which 1 is expressed in the form of a natural binary.

The transform process Y=Y1×A^T may be expressed by matrix multiplication, while in practice, the matrix multiplication may be implemented with a butterfly structure.

Intermediate values m1 and m2 may be defined by using formulas (19) and (20).

$$m1=\log_2(\text{Factor}/\sqrt{N}) \qquad \text{[formula (19)]}$$

$$m2=\log_2(N) \qquad \text{[formula (20)]}$$

In a limitation condition of a transform matrix A, values of s1 and s2 may satisfy s1=n+m1+m2−r, s2=m1+m2, s1≥0 and s2≥0.

During the process described above, the symbol "<<" may indicate to left shift data that is expressed in the form of a natural binary, and the symbol ">>" may indicate to right shift data that is expressed in the form of a natural binary.

A sixteenth embodiment is described below.

In video image coding, when a reconstructed residual is used during a reconstruction process of an image, a bit-width of the reconstructed residual may be n-bit. It may be required that a bit-width of intermediate data does not exceed r-bit during a transform process. For an N×N block, a corresponding reconstructed residual block may be C that is obtained by performing two-dimensional N×N inverse-transform on an inverse-quantized coefficient block X (a data bit-width of the block X may be s0). As described in the aforementioned embodiments, the transform matrix that satisfies J(A)<TH may be the matrix A. The inverse-transform may include following operations.

In operation 1, a first-dimensional inverse-transform may be performed on X so as to obtain a result, and then the result may be shifted right by s1-bit so as to obtain Y1.

For example, the aforementioned formula (14) may be satisfied.

Hereinafter, the meaning of formula (14) is described. In Y=X×A, w1 may be added to each element in a matrix Y so as to obtain a result, and the result that is expressed in the form of a natural binary may be shifted right by s1-bit so as to obtain a transform result Y1. When s1=0, w1=0, and when s1>0, w1 may be a result obtained by left shifting 1 by (s1−1)-bit, in which 1 is expressed in the form of a natural binary.

The transform process Y=X×A may be expressed by matrix multiplication, while in practice, the matrix multiplication may be implemented with a butterfly structure.

In operation 2, a second-dimensional inverse transform may be performed on Y1 so as to obtain a result, and then the result may be shifted right by s2-bit so as to obtain C.

For example, the aforementioned formula (15) may be satisfied.

Hereinafter, the meaning of formula (15) is described. In Y=A^T×Y1, w2 may be added to each element in a matrix Y so as to obtain a result, and the result that is expressed in the form of a natural binary may be shifted right by s1-bit so as to obtain a transform result C. When s2=0, w2=0, and when s2≥0, w2 may be a result obtained by left shifting 1 by (s2−1)-bit, in which 1 is expressed in the form of a natural binary.

The transform process Y=A^T×Y1 may be expressed by matrix multiplication, while in practice, the matrix multiplication may be implemented with a butterfly structure.

An intermediate value m may be defined by using the aforementioned formula (16).

In the limitation condition of the transform matrix A, the values of s1 and s2 may satisfy s1=s0+M−r, s2=r+m−n, s1≥0 and s2≥0.

During the process described above, the symbol "<<" may indicate to left shift data that is expressed in the form of a natural binary, and the symbol ">>" may indicate to right shift data that is expressed in the form of a natural binary.

As shown in FIG. 6N, the device 10 may determine a transform coefficient of a transformation unit by using a transform matrix configured of {{32, 32, 32, 32}, {42, 17, −17, −42}, {32, −32, −32, 32}, {17, −42, 42, −17}}. When an element in the n-th row of m-th column of a matrix is expressed as a_mn, a 4×4 matrix may be expressed as {{a_11, a_12, a_13, a_14}, {a_21, a_22, a_23, a_24}, {a_31, a_32, a_33, a_34}, {a_41, a_42, a_43, a_44}}. A matrix other than the 4×4 matrix may be expressed in a same manner. As another example, a 2×2 matrix may be expressed as {{a 11, a_12}, {a_21, a_22}}.

The device 10 may determine at least one transform unit to perform transformation on a residual in a coding unit. Here, the device 10 may determine a transform coefficient of a transformation unit by using a transform matrix configured of {{32, 32, 32, 32}, {42, 17, −17, −42}, {32, −32, −32, 32}, {17, −42, 42, −17}}.

Also, the element may have a value that is greater than an element of a minimum-value matrix and less than an element of a maximum-value matrix, wherein the minimum-value matrix is configured of elements of minimum value and the maximum-value matrix is configured of elements of maximum value which are used in a frequency transform. Here, in the transform matrix, a result value of a function indicating at least one selected from transform distortion, normalization, and orthogonality of the transform matrix may be less than a predetermined maximum threshold value.

FIG. 6N is an exemplary embodiment, and descriptions regarding FIG. 6N may be applied to all diagrams of FIG. 6. For example, the device 10 may perform the frequency transform by using matrices shown in FIGS. 6J, 6K, 6L, and 6M. Here, the matrices shown in FIGS. 6J, 6K, 6L, and 6M may be regarded as transform matrices, transform coefficients of the transform matrices may be determined, and detailed contents are described with reference to FIG. 6N.

Figure 7:
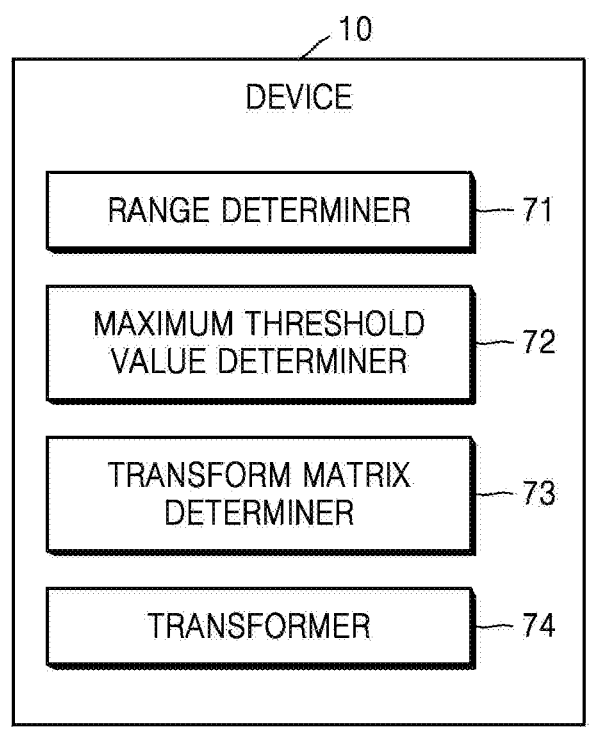
FIG. 7 illustrates a block diagram of the device 10, according to various embodiments.

FIG. 7 illustrates a block diagram of the device 10, according to various embodiments.

The device 10 may be a device capable of performing the aforementioned signal transforming method, and implementation of all embodiments of performing the aforementioned signal transforming method is possible.

As shown in FIG. 7, the device 10 may include a range determiner 71, a maximum threshold value determiner 72, a transform matrix determiner 73, and a transformer 74. However, the device 10 may be embodied with more elements than the shown elements or may be embodied with fewer elements than the shown elements.

Hereinafter, the elements are sequentially described below.

The range determiner 71 may determine a minimum-value matrix and a maximum-value matrix with respect to elements of a matrix used in frequency transformation, wherein the minimum-value matrix is configured of the elements of minimum value and the maximum-value matrix is configured of the elements of maximum value.

In addition, the range determiner 71 may determine, based on a size of the matrix, a DCT matrix that is a matrix used in a DCT transform, and may determine, by using the determined DCT matrix, the minimum-value matrix and the maximum-value matrix which are configured of integer elements. The DCT matrix may include irrational elements.

In addition, the range determiner 71 may determine the minimum-value matrix as a matrix including element values obtained by multiplying each of elements of the determined DCT matrix by a predetermined factor, rounding multiplication results of the multiplying, and then subtracting a predetermined value from results of the rounding, and may determine the maximum-value matrix as a matrix including element values obtained by multiplying each of the elements of the determined DCT matrix by the predetermined factor, rounding the results of the multiplying, and then adding the predetermined value to the results of the rounding.

The maximum threshold value determiner 72 may determine a maximum threshold value of a result value of a function indicating at least one selected from transform distortion, normalization, and orthogonality of the matrix.

In addition, the maximum threshold value determiner 72 may determine a reference matrix including the element values obtained by multiplying each of the elements of the determined DCT matrix by the predetermined factor, and rounding the results of the multiplying, may determine a reference matrix function value that is a result value of a function indicating at least one selected from transform distortion, normalization, and orthogonality of the reference matrix, and may determine the reference matrix function value as the maximum threshold value.

In addition, the maximum threshold value determiner 72 may determine a reference matrix that is a matrix configured of integer elements, based on a method defined in H.265, may determine a reference matrix function value that is a result value of a function indicating at least one selected from transform distortion, normalization, and orthogonality of the reference matrix, and may determine the reference matrix function value as the maximum threshold value.

In addition, the maximum threshold value determiner 72 may determine the maximum threshold value by multiplying a number of rows of the transform matrix by a predetermined value.

The transform matrix determiner 73 may determine a transform matrix configured of elements that are greater than the elements of the minimum-value matrix and less than the elements of the maximum-value matrix at respective positions of the matrix, and in which the result value of the function is less than the maximum threshold value.

The transformer 74 may transform an input signal by using the determined transform matrix.

In addition, the transformer 74 may determine an input matrix that is a matrix with respect to the input signal, and may perform an operation on the determined transform matrix and the input matrix, and thus may determine an output matrix that is a matrix with respect to an output signal.

In addition, the transformer 74 may determine a matrix transposed from the determined transform matrix, and may perform an operation on the matrix transposed from the determined transform matrix and the input matrix, and thus may determine an output matrix that is a matrix with respect to an output signal.

The embodiments described above with reference to FIG. 7 are only exemplary embodiments, and it will be understood by one of ordinary skill in the art that various changes in form and details may be made therein without departing from the spirit and scope of the present invention.

Figure 8:
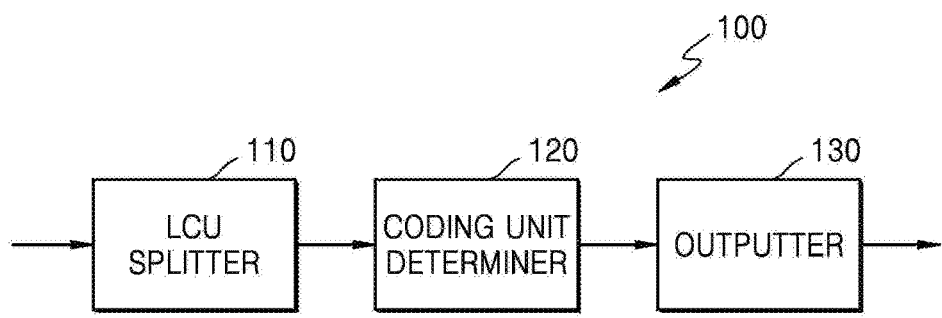
FIG. 8 illustrates a block diagram of a video encoding apparatus based on coding units of a tree structure, according to an embodiment.

FIG. 8 illustrates a block diagram of a video encoding apparatus based on coding units of a tree structure 100, according to an embodiment of the present invention.

The video encoding apparatus involving video prediction based on coding units of the tree structure 100 includes a coding unit determiner 120 and an output unit 130.

Hereinafter, for convenience of description, the video encoding apparatus involving video prediction based on coding units of the tree structure 100 is referred as 'video encoding apparatus 100'.

The coding unit determiner 120 may split a current picture based on a largest coding unit that is a coding unit having a maximum size for a current picture of an image. If the current picture is larger than the largest coding unit, image data of the current picture may be split into the at least one largest coding unit. The largest coding unit according to an embodiment may be a data unit having a size of 32×32, 64×64, 128×128, 256×256, etc., wherein a shape of the data unit is a square having a width and length in squares of 2.

A coding unit according to an embodiment may be characterized by a maximum size and a depth. The depth denotes the number of times the coding unit is spatially split from the largest coding unit, and as the depth deepens, deeper coding units according to depths may be split from the largest coding unit to a minimum coding unit. A depth of the largest coding unit is an uppermost depth and a depth of the minimum coding unit is a lowermost depth. Since a size of a coding unit corresponding to each depth decreases as the depth of the largest coding unit deepens, a coding unit corresponding to an upper depth may include a plurality of coding units corresponding to lower depths.

As described above, the image data of the current picture is split into the largest coding units according to a maximum size of the coding unit, and each of the largest coding units may include deeper coding units that are split according to depths. Since the largest coding unit according to an embodiment is split according to depths, the image data of a spatial domain included in the largest coding unit may be hierarchically classified according to depths.

A maximum depth and a maximum size of a coding unit, which limit the total number of times a height and a width of the largest coding unit are hierarchically split, may be predetermined.

The coding unit determiner 120 encodes at least one split region obtained by splitting a region of the largest coding unit according to depths, and determines a depth to output a finally encoded image data according to the at least one split region. In other words, the coding unit determiner 120 determines a final depth by encoding the image data in the deeper coding units according to depths, according to the largest coding unit of the current picture, and selecting a depth having the least encoding error. The determined final depth and the encoded image data according to the determined final depth are output to the output unit 130.

The image data in the largest coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one final depth may be determined for each largest coding unit.

The size of the largest coding unit is split as a coding unit is hierarchically split according to depths, and as the number of coding units increases. Also, even if coding units correspond to the same depth in one largest coding unit, it is determined whether to split each of the coding units corresponding to the same depth to a lower depth by measuring an encoding error of the image data of the each coding unit, separately. Accordingly, even when image data is included in one largest coding unit, the encoding errors may differ according to regions in the one largest coding unit, and thus the final depths may differ according to regions in the image data. Thus, one or more final depths may be set in one largest coding unit, and the image data of the largest coding unit may be divided according to coding units of at least one final depth.

Accordingly, the coding unit determiner 120 may determine coding units having a tree structure included in the largest coding unit. The 'coding units having a tree structure' according to an embodiment include coding units corresponding to a depth determined to be the final depth, from among all deeper coding units included in the largest coding unit. A coding unit of a final depth may be hierarchically determined according to depths in the same region of the largest coding unit, and may be independently determined in different regions. Similarly, a final depth in a current region may be independently determined from a final depth in another region.

A maximum depth according to an embodiment is an index related to the number of splitting times from a largest coding unit to a minimum coding unit. A first maximum depth according to an embodiment may denote the total number of splitting times from the largest coding unit to the minimum coding unit. A second maximum depth according to an embodiment may denote the total number of depth levels from the largest coding unit to the minimum coding unit. For example, when a depth of the largest coding unit is 0, a depth of a coding unit, in which the largest coding unit is split once, may be set to 1, and a depth of a coding unit, in which the largest coding unit is split twice, may be set to 2. Here, if the minimum coding unit is a coding unit in which the largest coding unit is split four times, 5 depth levels of depths 0, 1, 2, 3, and 4 exist, and thus the first maximum depth may be set to 4, and the second maximum depth may be set to 5.

Prediction encoding and transformation may be performed according to the largest coding unit. The prediction encoding and the transformation are also performed based on the deeper coding units according to a depth equal to or depths less than the maximum depth, according to the largest coding unit.

Since the number of deeper coding units increases whenever the largest coding unit is split according to depths, encoding, including the prediction encoding and the transformation, is performed on all of the deeper coding units generated as the depth deepens. For convenience of description, the prediction encoding and the transformation will now be described based on a coding unit of a current depth, in a largest coding unit.

The video encoding apparatus 100 according to the present embodiment may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the largest coding unit, the prediction encoding may be performed based on a coding unit corresponding to a final depth, i.e., based on a coding unit that is no longer split into coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one selected from a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition mode may selectively include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one selected from an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 may also perform the transformation on the image data in a coding unit based not only on the coding unit for encoding the image data, but also based on a data unit that is different from the coding unit. In order to perform the transformation in the coding unit, the transformation may be performed based on a data unit having a size smaller than or equal to the coding unit. For example, the data unit for the transformation may include a data unit for an intra mode and a data unit for an inter mode.

The transformation unit in the coding unit may be recursively split into smaller sized regions in the similar manner as the coding unit according to the tree structure. Thus, residual data in the coding unit may be divided according to the transformation unit having the tree structure according to transformation depths.

A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. In other words, the transformation unit having the tree structure may be set according to the transformation depths.

Split information according to depths requires not only information about depths, but also about information related to prediction encoding and transformation. Accordingly, the coding unit determiner 120 not only determines a depth having a least encoding error, but also determines a partition mode in a prediction unit, a prediction mode according to prediction units, and a size of a transformation unit for transformation.

Coding units according to a tree structure in a largest coding unit and methods of determining a prediction unit/partition, and a transformation unit, according to embodiments, will be described in detail later with reference to FIGS. 9 through 19.

The coding unit determiner 120 may measure an encoding error of deeper coding units according to depths by using Rate-Distortion Optimization based on Lagrangian multipliers.

The output unit 130 outputs the image data of the largest coding unit, which is encoded based on the at least one depth determined by the coding unit determiner 120, and the split information according to depths, in bitstreams.

The encoded image data may be obtained by encoding residual data of an image.

The split information according to depths may include depth information, information about the partition mode in the prediction unit, information about the prediction mode, split information of the transformation unit, or the like.

The information about the final depth may be defined by using split information according to depths, which indicates whether encoding is performed on coding units of a lower depth instead of a current depth. If the current depth of the current coding unit is the depth, image data in the current coding unit is encoded and output, and thus the split information may be defined not to split the current coding unit to a lower depth. Alternatively, if the current depth of the current coding unit is not the depth, the encoding is performed on the coding unit of the lower depth, and thus the split information may be defined to split the current coding unit to obtain the coding units of the lower depth.

If the current depth is not the depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one largest coding unit, and split information is determined for a coding unit of a depth, split information may be determined for one largest coding unit. Also, data of the largest coding unit may be hierarchically split according to depths, and thus a depth of the data may be different according to locations, so that the depth and the split information may be set for the data.

Accordingly, the output unit 130 according to the present embodiment may assign encoding information about a corresponding depth and an encoding mode to at least one selected from the coding unit, the prediction unit, and a minimum unit included in the largest coding unit.

The minimum unit according to an embodiment is a square data unit obtained by splitting the minimum coding unit constituting the lowermost depth by 4. Alternatively, the minimum unit according to an embodiment may be a maximum square data unit that may be included in all of the coding units, prediction units, partition units, and transformation units included in the largest coding unit.

For example, the encoding information output by the output unit 130 may be classified into encoding information according to deeper coding units, and encoding information according to prediction units. The encoding information according to the deeper coding units may include the information about the prediction mode and about the size of the partitions. The encoding information according to the prediction units may include information about an estimated direction during an inter mode, about a reference image index of the inter mode, about a motion vector, about a chroma component of an intra mode, and about an interpolation method during the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit permitted with respect to a current video, and information about a minimum size of the transformation unit may also be output through a header of a bitstream, a sequence parameter set, or a picture parameter set. The output unit 130 may encode and output reference information, prediction information, and slice type information that are related to prediction.

According to the simplest embodiment for the video encoding apparatus 100, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit with the current depth having a size of 2N×2N may include a maximum of 4 of the coding units with the lower depth.

Accordingly, the video encoding apparatus 100 may form the coding units having the tree structure by determining coding units having an optimum shape and an optimum size for each largest coding unit, based on the size of the largest coding unit and the maximum depth determined considering characteristics of the current picture. Also, since encoding may be performed on each largest coding unit by using any one of various prediction modes and transformations, an optimum encoding mode may be determined considering characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus 100 according to the present embodiment, image compression efficiency may be increased since a coding unit is adjusted while considering characteristics of an image while increasing a maximum size of a coding unit while considering a size of the image.

The device 10 described above with reference to FIG. 1 may include the video encoding apparatuses 100 corresponding to the number of layers so as to encode single layer images in each of the layers of a multilayer video. For example, a first layer encoder 12 may include one video encoding apparatus 100, and a second layer encoder 14 may include the video encoding apparatuses 100 corresponding to the number of second layers.

When the video encoding apparatuses 100 encode first layer images, the coding unit determiner 120 may determine a prediction unit for inter-image prediction for each of coding units of a tree structure according to each largest coding unit, and may perform the inter-image prediction on each prediction unit.

When the video encoding apparatuses 100 encode second layer images, the coding unit determiner 120 may determine prediction units and coding units of a tree structure according to each largest coding unit, and may perform inter-prediction on each of the prediction units.

The video encoding apparatuses 100 may encode a luminance difference between the first layer image and the second layer image so as to compensate for the luminance difference. However, whether or not to perform luminance may be determined according to a coding mode of a coding unit. For example, luminance compensation may be performed only on a prediction unit having a size of 2N×2N.

Figure 9:
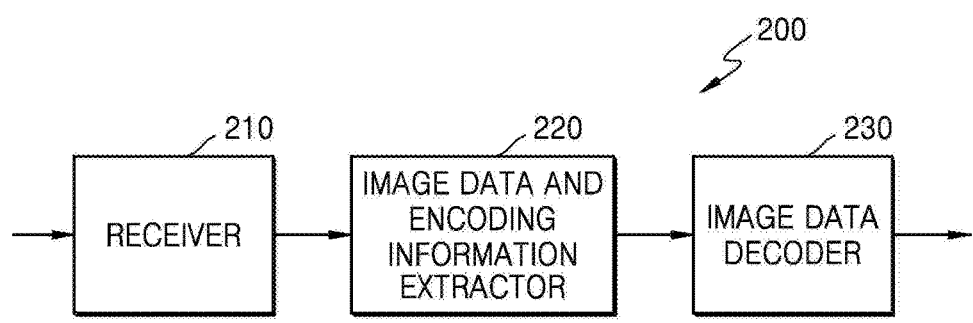
FIG. 9 illustrates a block diagram of a video decoding apparatus based on coding units of a tree structure, according to an embodiment.

FIG. 9 illustrates a block diagram of a video decoding apparatus based on coding units of a tree structure 200, according to various embodiments.

The video decoding apparatus involving video prediction based on coding units of the tree structure 200 according to the present embodiment includes a receiver 210, an image data and encoding information extractor 220, and an image data decoder 230. Hereinafter, for convenience of description, the video decoding apparatus involving video prediction based on coding units of the tree structure 200 according to the embodiment is referred as 'video decoding apparatus 200'.

Definitions of various terms, such as a coding unit, a depth, a prediction unit, a transformation unit, and various split information, for decoding operations of the video decoding apparatus 200 according to the present embodiment are identical to those described with reference to FIG. 8 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each largest coding unit, and outputs the extracted image data to the image data decoder 230. The image data and encoding information extractor 220 may extract information about a maximum size of a coding unit of a current picture, from a header about the current picture, a sequence parameter set, or a picture parameter set.

Also, the image data and encoding information extractor 220 extracts a final depth and split information with respect to the coding units having a tree structure according to each largest coding unit, from the parsed bitstream. The extracted final depth and the split information are output to the image data decoder 230. That is, the image data in a bit stream is split into the largest coding unit so that the image data decoder 230 decodes the image data for each largest coding unit.

The depth and the split information according to the largest coding unit may be set for information about at least one coding unit corresponding to the depth, and split information according to depths may include partition mode information of a corresponding coding unit, prediction mode information, and split information of a transformation unit. Also, splitting information may be extracted as the information about the depth.

The depth and the split information according to each largest coding unit extracted by the image data and encoding information extractor 220 is information about a depth and split information determined to generate a minimum encoding error when an encoder, such as the video encoding apparatus 100, repeatedly performs encoding for each deeper coding unit according to depths according to each largest coding unit. Accordingly, the video decoding apparatus 200 may reconstruct an image by decoding the image data according to a final depth and an encoding mode that generates the minimum encoding error.

Since encoding information about the depth and the encoding mode may be assigned to a predetermined data unit from among a corresponding coding unit, a prediction unit, and a minimum unit, the image data and encoding information extractor 220 may extract a depth and split information according to the predetermined data units. If information about a depth and split of a corresponding largest coding unit is recorded according to predetermined data units, the predetermined data units having the same information about depth and split may be inferred to be the data units included in the same largest coding unit.

The image data decoder 230 reconstructs the current picture by decoding the image data in each largest coding unit based on the information about depth and split according to the largest coding units. In other words, the image data decoder 230 may decode the encoded image data based on the extracted information about the partition mode, the prediction mode, and the transformation unit for each coding unit from among the coding units having the tree structure included in each largest coding unit. A decoding process may include a prediction including intra prediction and motion compensation, and an inverse transformation.

The image data decoder 230 may perform intra prediction or motion compensation according to a partition and a prediction mode of each coding unit, based on the information about the partition mode and the prediction mode of the prediction unit of the coding unit according to depths.

In addition, the image data decoder 230 may read information about a transformation unit according to a tree structure for each coding unit so as to perform inverse transformation based on transformation units for each coding unit, for inverse transformation for each largest coding unit. Via the inverse transformation, a pixel value of a spatial domain of the coding unit may be reconstructed.

The image data decoder 230 may determine a depth of a current largest coding unit by using split information according to depths. If the split information indicates that image data is no longer split in the current depth, the current depth is a depth. Accordingly, the image data decoder 230 may decode encoded data in the current largest coding unit by using the information about the partition mode of the prediction unit, the prediction mode, and the size of the transformation unit for each coding unit corresponding to the final depth.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. As such, the current coding unit may be decoded by obtaining the information about the encoding mode for each coding unit.

Also, the device 10 described above with reference to FIG. 1 may include the video decoding apparatuses 200 corresponding to the number of views, so as to decode a received first layer image stream and a received second layer image stream and to reconstruct first layer images and second layer images.

When the first layer image stream is received, the image data decoder 230 of the video decoding apparatus 200 may split samples of the first layer images, which are extracted from the first layer image stream by an extractor 220, into coding units according to a tree structure of a largest coding unit. The image data decoder 230 may perform motion compensation, based on prediction units for the inter-image prediction, on each of the coding units according to the tree structure of the samples of the first layer images, and may reconstruct the first layer images.

When the second layer image stream is received, the image data decoder 230 of the video decoding apparatus 200 may split samples of the second layer images, which are extracted from the second layer image stream by the extractor 220, into coding units according to a tree structure of a largest coding unit. The image data decoder 230 may perform motion compensation, based on prediction units for the inter-image prediction, on each of the coding units of the samples of the second layer images, and may reconstruct the second layer images.

The extractor 220 may obtain, from the bitstream, information related to a luminance error so as to compensate for the luminance difference between the first layer image and the second layer image. However, whether or not to perform luminance may be determined according to a coding mode of a coding unit. For example, luminance compensation may be performed only on a prediction unit having a size of 2N×2N.

Thus, the video decoding apparatus 200 may obtain information about at least one coding unit that generates the minimum encoding error when encoding is recursively performed for each largest coding unit, and may use the information to decode the current picture. That is, the coding units having the tree structure determined to be the optimum coding units in each largest coding unit may be decoded.

Accordingly, even if an image has high resolution or has an excessively large data amount, the image may be efficiently decoded and reconstructed by using a size of a coding unit and an encoding mode, which are adaptively determined according to characteristics of the image, by using optimal split information received from an encoder.

Figure 10:
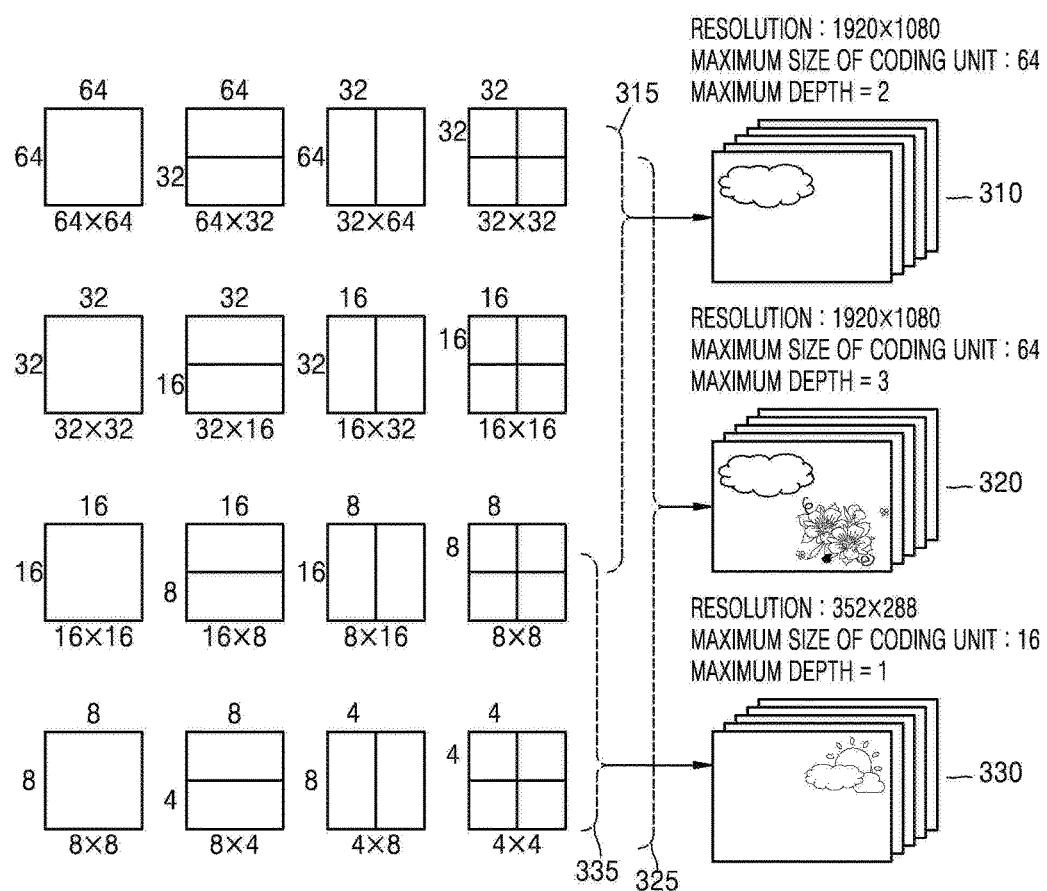
FIG. 10 illustrates a diagram for describing a concept of coding units according to an embodiment of the present invention.

FIG. 10 illustrates a diagram for describing a concept of coding units according to various embodiments.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 10 denotes the total number of splits from a largest coding unit to a minimum decoder.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having a higher resolution than the video data 330 may be 64.

Since the maximum depth of the video data 310 is 2, coding units 315 of the vide data 310 may include a largest coding unit having a long axis size of 64, and coding units having long axis sizes of 32 and 16 since depths are deepened to two layers by splitting the largest coding unit twice. On the other hand, since the maximum depth of the video data 330 is 1, coding units 335 of the video data 330 may include a largest coding unit having a long axis size of 16, and coding units having a long axis size of 8 since depths are deepened to one layer by splitting the largest coding unit once.

Since the maximum depth of the video data 320 is 3, coding units 325 of the video data 320 may include a largest coding unit having a long axis size of 64, and coding units having long axis sizes of 32, 16, and 8 since the depths are deepened to 3 layers by splitting the largest coding unit three times. As a depth deepens, an expression capability with respect to detailed information may be improved.

Figure 11:
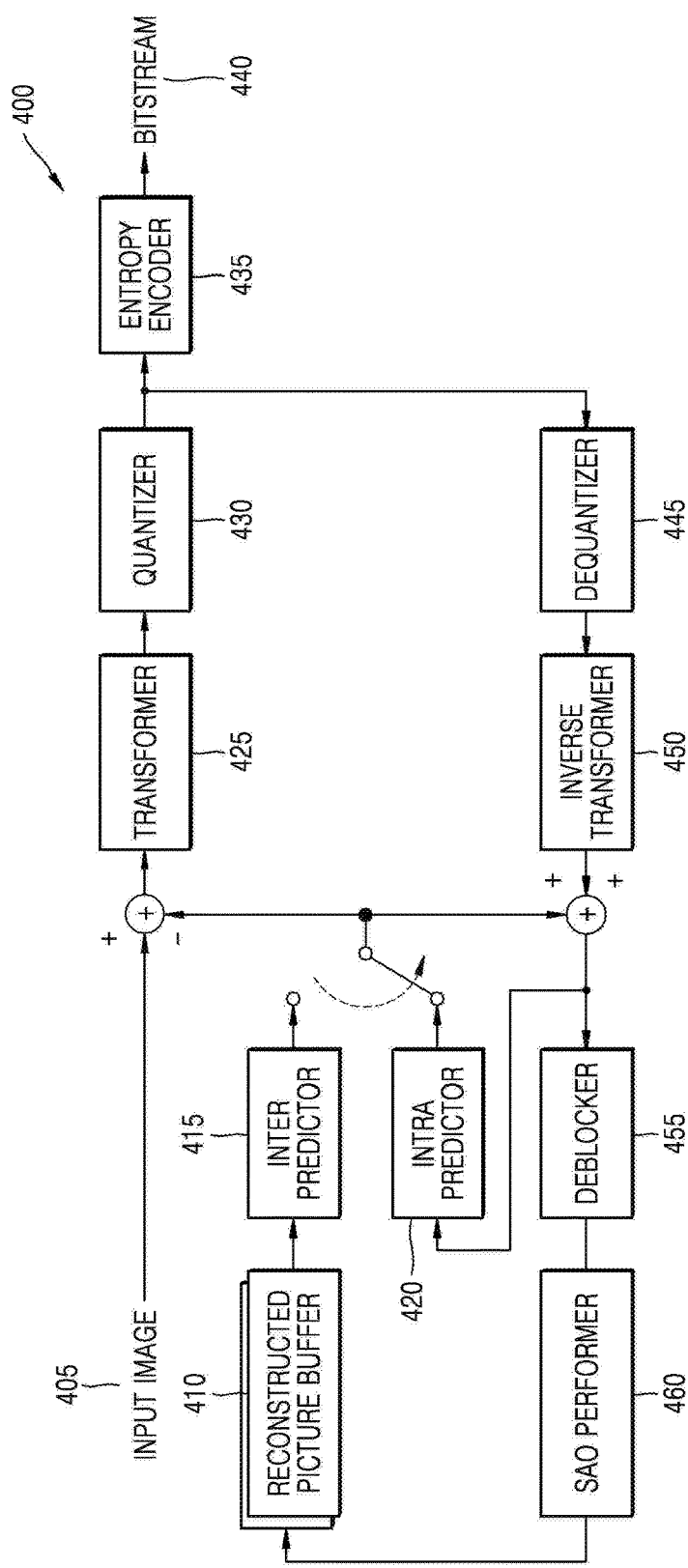
FIG. 11 illustrates a block diagram of an image encoder based on coding units, according to an embodiment of the present invention.

FIG. 11 illustrates a block diagram of an image encoder 400 based on coding units, according to various embodiments.

The image encoder 400 according to the embodiment performs operations of the video encoding apparatus 100 to encode image data. That is, an intra predictor 420 performs intra prediction on a coding unit in an intra mode and from among a current image 405, according to prediction units, and an inter predictor 415 performs inter prediction on a coding unit in an inter mode according to prediction units, by using a reference image obtained from the current image 405 and a reconstructed picture buffer 410. The current image 405 may be split by a largest coding unit and may be sequentially encoded. Here, encoding may be performed on coding units of a tree structure, which are split from the largest coding unit.

Prediction data with respect to the coding unit in each mode output from the intra predictor 420 or the inter predictor 415 is subtracted from data with respect to an encoded coding unit of the current image 405, so that residue data is generated. The residue data is output as a quantized transformation coefficient of each transformation unit through a transformer 425 and a quantizer 430. The quantized transformation coefficient is reconstructed as residue data of a spatial domain through an inverse quantizer 445 and an inverse transformer 450. The reconstructed residue data of the spatial domain is added to the prediction data with respect to the coding unit in each mode output from the intra predictor 420 or the inter predictor 415, and thus is reconstructed as data of the spatial domain with respect to the coding unit of the current image 405. The reconstructed data of the spatial domain is generated as a reconstructed image through a deblocking unit 455 and an SAO performer 460. The generated reconstructed image is stored in the reconstructed picture buffer 410. Reconstructed images stored in the reconstructed picture buffer 410 may be used as a reference image for inter prediction with respect to another image. The transformation coefficient quantized in the transformer 425 and the quantizer 430 may be output as a bitstream 440 through an entropy encoder 435.

In order for the image encoder 400 to be applied in the video encoding apparatus 100, all elements of the image encoder 400, i.e., the inter predictor 415, the intra predictor 420, the transformer 425, the quantizer 430, the entropy encoder 435, the inverse quantizer 445, the inverse transformer 450, the deblocking unit 455, and the SAO performer 460 may perform operations based on each coding unit among coding units according to a tree structure in each largest coding unit.

In particular, the intra predictor 420 and the inter predictor 415 may determine a partition mode and a prediction mode of each coding unit from among the coding units according to a tree structure by referring to a maximum size and a maximum depth of a current largest coding unit, and the transformer 425 may determine whether or not to split a transformation unit according to a quadtree in each coding unit from among the coding units according to the tree structure.

Figure 12:
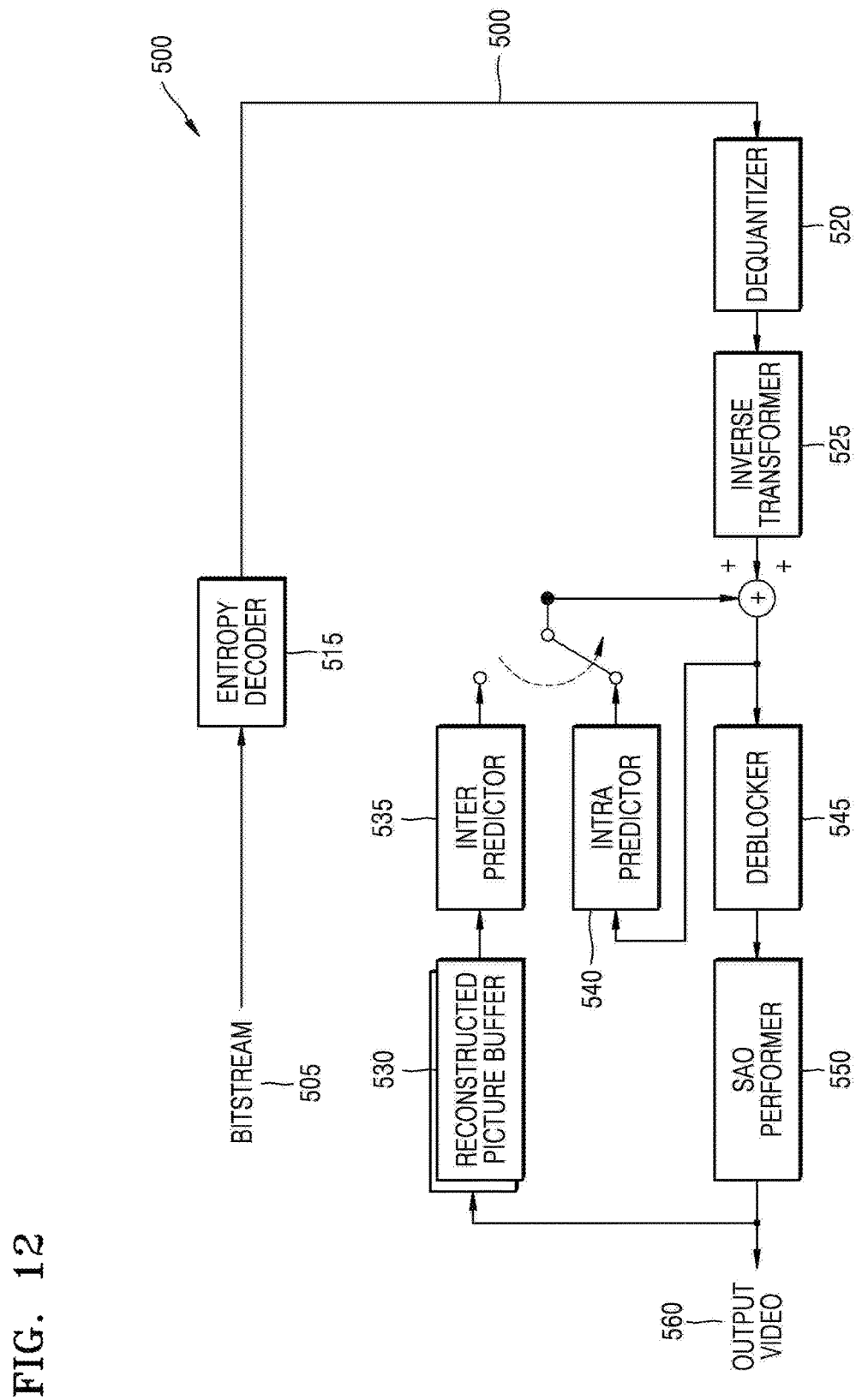
FIG. 12 illustrates a block diagram of an image decoder based on coding units, according to an embodiment of the present invention.

FIG. 12 illustrates a block diagram of an image decoder 500 based on coding units, according to various embodiments.

An entropy decoder 515 parses, from a bitstream 505, encoded image data to be decoded and encoding information required for decoding. The encoded image data is as a quantized transformation unit, and an inverse quantizer 520 and an inverse transformer 525 reconstruct residue data from the quantized transformation unit.

An intra predictor 540 performs intra prediction on a coding unit in an intra mode according to prediction units. An inter predictor 535 performs inter prediction by using a reference image with respect to a coding unit in an inter mode from among a current image, which is obtained by a reconstructed picture buffer 530 according to prediction units.

Prediction data with respect to the coding unit in each mode which passed through the intra predictor 540 or the inter predictor 535, and the residue data are added, so that data of a spatial domain with respect to the coding unit of the current image 405 may be reconstructed, and the reconstructed data of the spatial domain may be output as a output video through a deblocking unit 545 and an SAO performer 550.

In order for the image data decoder 230 of the video decoding apparatus 200 to decode the image data, operations after the entropy decoder 515 of the image decoder 500 may be sequentially performed.

In order for the image decoder 500 to be applied in the video decoding apparatus 200, all elements of the image decoder 500, i.e., the entropy decoder 515, the inverse quantizer 520, the inverse transformer 525, the intra predictor 540, the inter predictor 535, the deblocking unit 545, and the SAO performer 550 may perform operations based on each coding unit from among coding units according to a tree structure for each largest coding unit.

In particular, the intra predictor 540 and the inter predictor 535 may determine a partition mode and a prediction mode of each coding unit from among the coding units according to a tree structure, and the inverse transformer 525 may determine whether or not to split a transformation unit according to a quadtree in each coding unit.

The encoding operation of FIG. 10 and the decoding operation of FIG. 11 are described as a videostream encoding operation and a videostream decoding operation, respectively, in a single layer. Therefore, if the device 10 of FIG. 1 encodes a videostream of at least two layers, the encoder 12 may include the image encoder 400 for each of layers. Similarly, if the decoder 26 of FIG. 10 decodes a videostream of at least two layers, the decoder 26 may include the image decoder 500 for each of layers.

Figure 13:
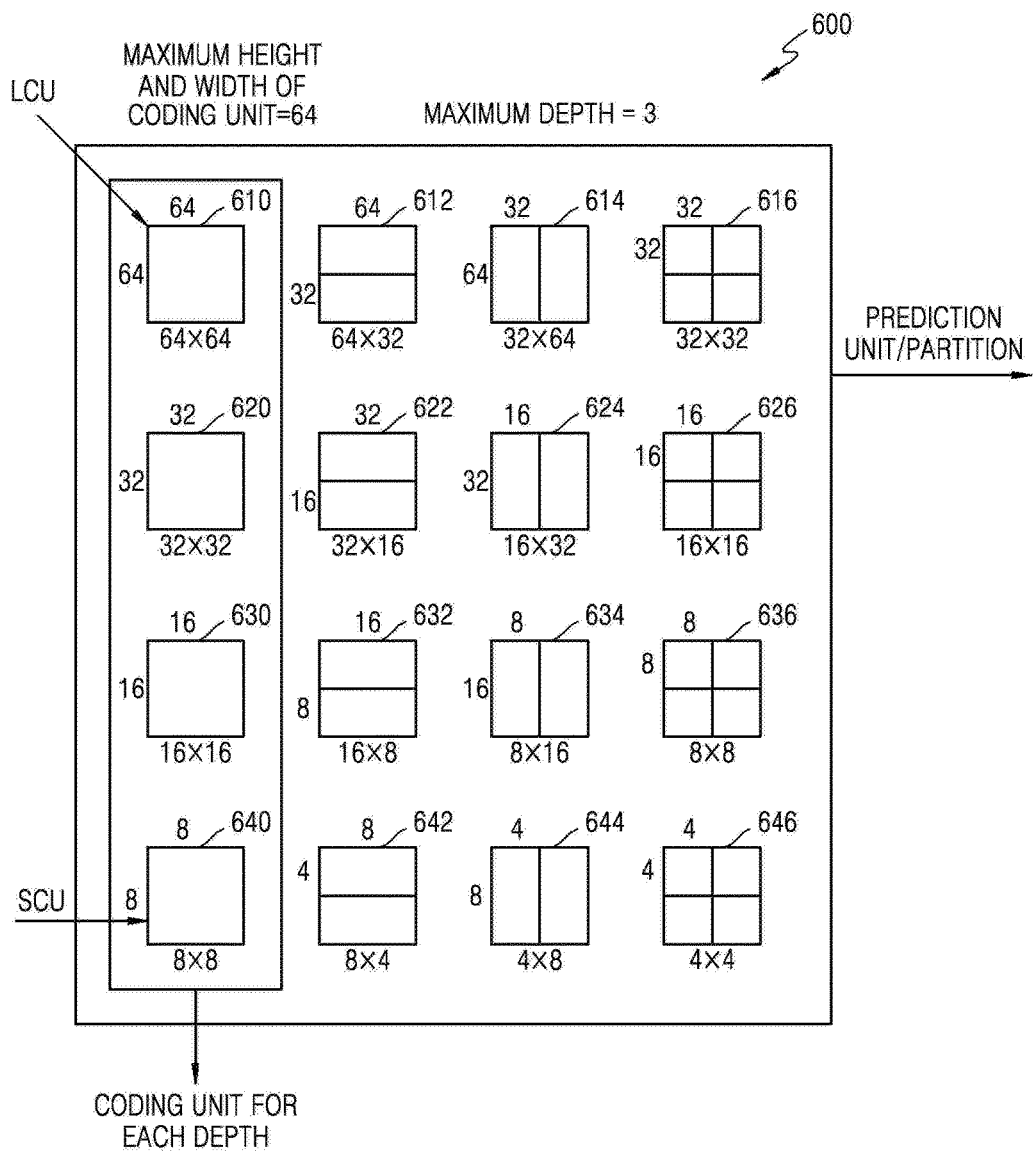
FIG. 13 illustrates a diagram illustrating deeper coding units according to depths, and partitions, according to an embodiment of the present invention.

FIG. 13 illustrates a diagram illustrating deeper coding units according to depths, and partitions, according to various embodiments.

The video encoding apparatus 100 according to the present embodiment and the video decoding apparatus 200 according to the present embodiment use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to the present embodiment, the maximum height and the maximum width of the coding units are each 64, and the maximum depth is 3. In this case, the maximum depth refers to a total number of times the coding unit is split from the largest coding unit to the minimum coding unit. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a largest coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, and a coding unit 640 having a size of 8×8 and a depth of 3. The coding unit 640 having the size of 8×8 and the depth of 3 is a minimum coding unit.

The prediction unit and the partitions of a coding unit are arranged along the horizontal axis according to each depth. In other words, if the coding unit 610 having a size of 64×64 and a depth of 0 is a prediction unit, the prediction unit may be split into partitions include in the encoder 610, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

In order to determine the at least one final depth of the coding units constituting the largest coding unit 610, the coding unit determiner 120 of the video encoding apparatus 100 performs encoding for coding units corresponding to each depth included in the largest coding unit 610.

The number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error that is a representative encoding error may be selected for the current depth by performing encoding for each prediction unit in the coding units corresponding to the current depth, along the horizontal axis of the hierarchical structure 600. Alternatively, the minimum encoding error may be searched for by comparing representative encoding errors according to depths, by performing encoding for each depth as the depth deepens along the vertical axis of the hierarchical structure 600. A depth and a partition having the minimum encoding error in the coding unit 610 may be selected as the final depth and a partition mode of the coding unit 610.

Figure 14:
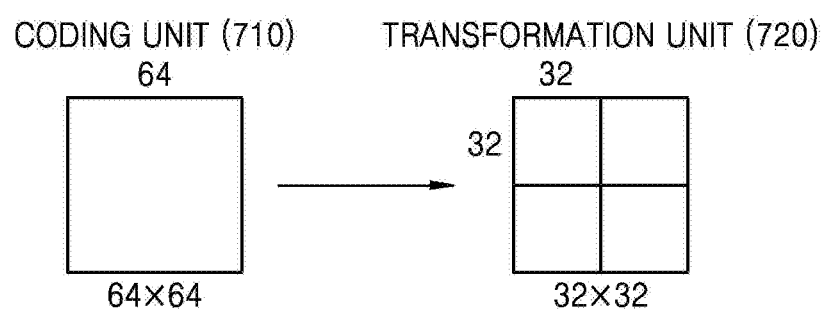
FIG. 14 illustrates a diagram for describing a relationship between a coding unit and transformation units, according to an embodiment of the present invention.

FIG. 14 illustrates a diagram for describing a relationship between a coding unit 710 and transformation units 720, according to various embodiments.

The video encoding apparatus 100 according to the present embodiment or the video decoding apparatus 200 according to the present embodiment encodes or decodes an image according to coding units having sizes smaller than or equal to a largest coding unit for each largest coding unit. Sizes of transformation units for transformation during encoding may be selected based on data units that are not larger than a corresponding coding unit.

For example, in the video encoding apparatus 100 or the video decoding apparatus 200, if a size of the coding unit

710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error with respect to an original image may be selected.

Figure 15:
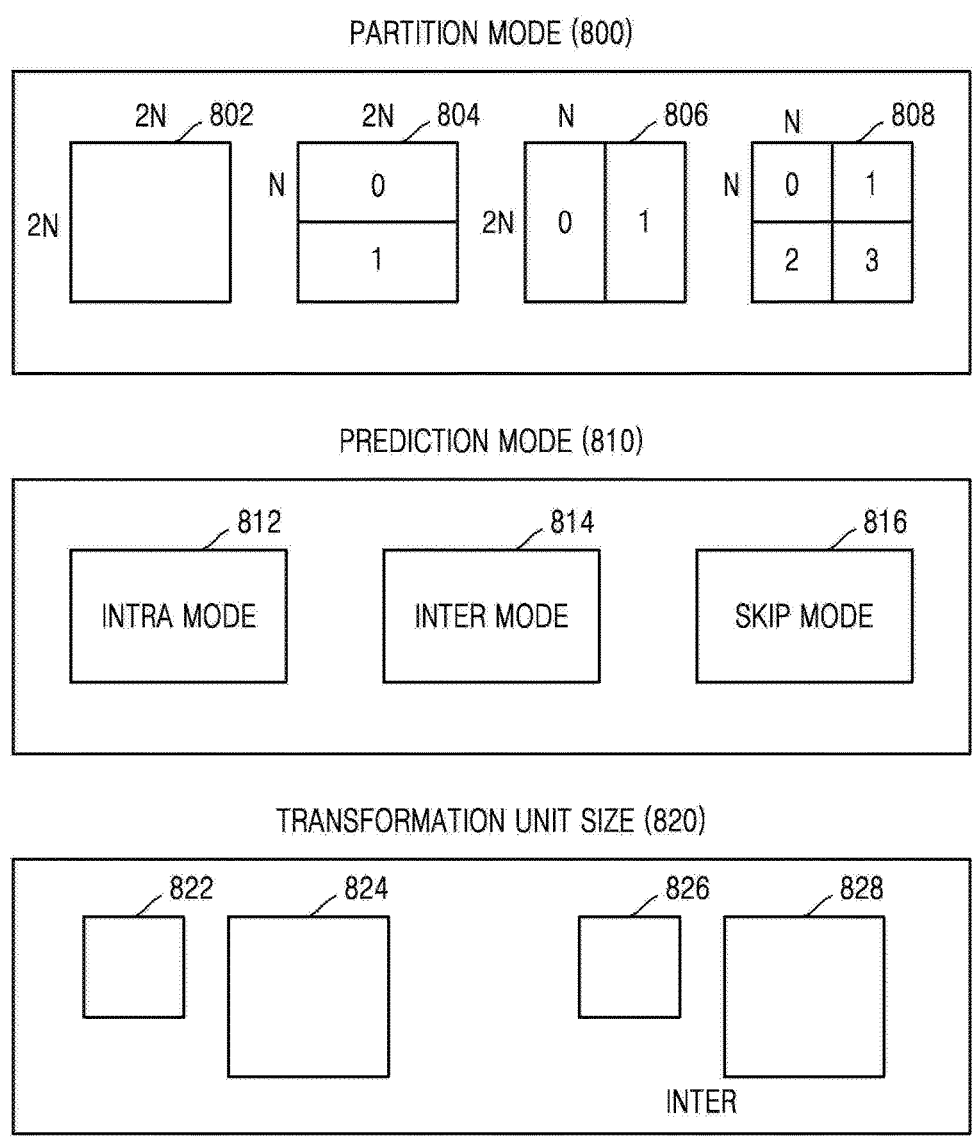
FIG. 15 illustrates a plurality of pieces of encoding information according to depths, according to an embodiment of the present invention.

FIG. 15 illustrates a plurality of pieces of encoding information according to depths, according to various embodiments.

The output unit 130 of the video encoding apparatus 100 may encode and transmit partition mode information 800, prediction mode information 810, and transformation unit size information 820 for each coding unit corresponding to a depth, as split information.

The partition mode information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the partition mode information 800 is set to indicate one of the partition 804 having a size of 2N×N, the partition 806 having a size of N×2N, and the partition 808 having a size of N×N.

The prediction mode information 810 indicates a prediction mode of each partition. For example, the prediction mode information 810 may indicate a mode of prediction encoding performed on a partition indicated by the partition mode information 800, i.e., an intra mode 812, an inter mode 814, or a skip mode 816.

The transformation unit size information 820 indicates a transformation unit to be based on when transformation is performed on a current coding unit. For example, the transformation unit may be a first intra transformation unit 822, a second intra transformation unit 824, a first inter transformation unit 826, or a second inter transformation unit 828.

The image data and encoding information extractor 220 of the video decoding apparatus 200 may extract and use the partition mode information 800, the prediction mode information 810, and the transformation unit size information 820 for decoding, according to each deeper coding unit.

Figure 16:
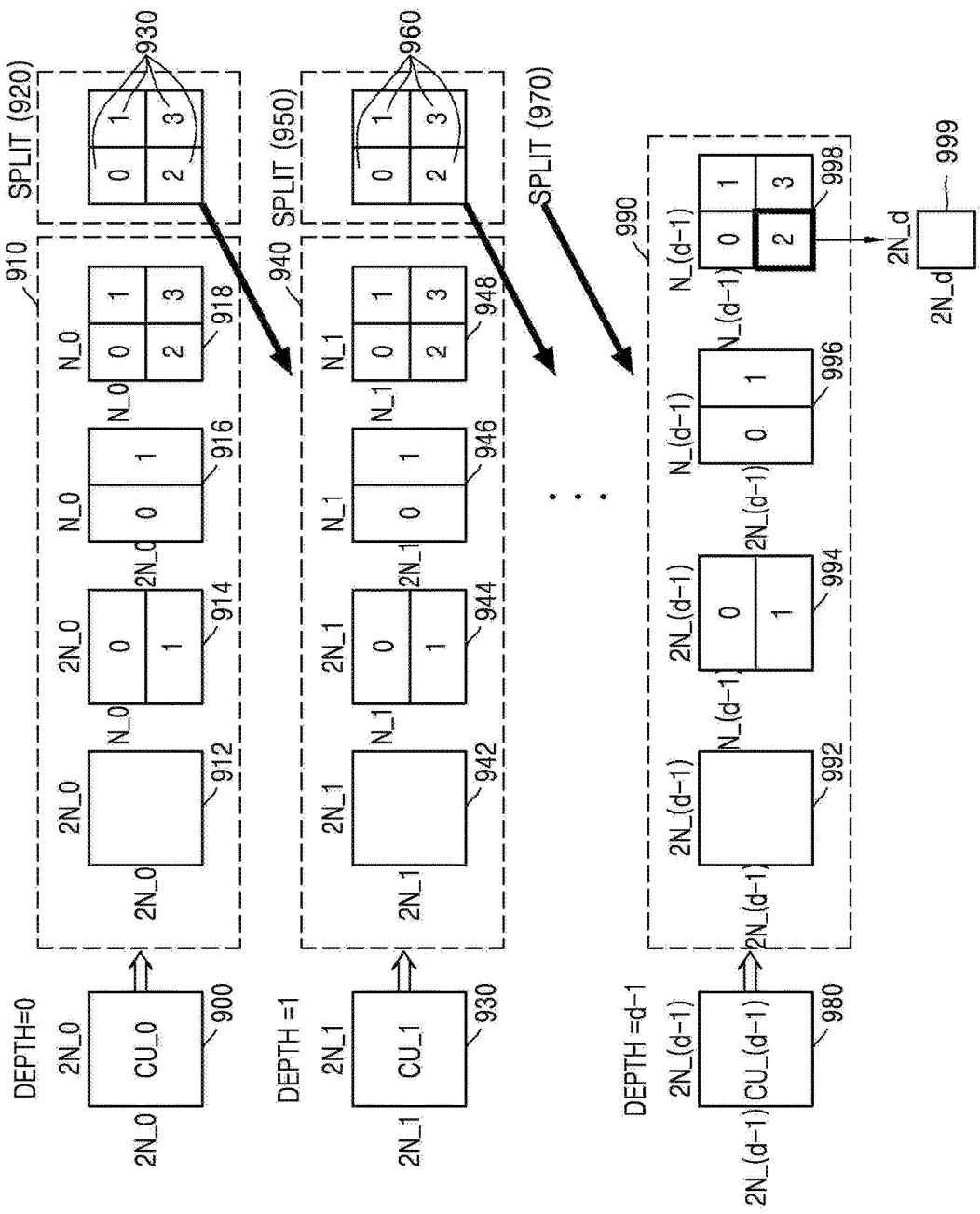
FIG. 16 is a diagram of deeper coding units according to depths, according to an embodiment of the present invention.

FIG. 16 is a diagram of deeper coding units according to depths, according to various embodiments.

Split information may be used to indicate a change of a depth. The spilt information indicates whether a coding unit of a current depth is split into coding units of a lower depth.

Figure 23:
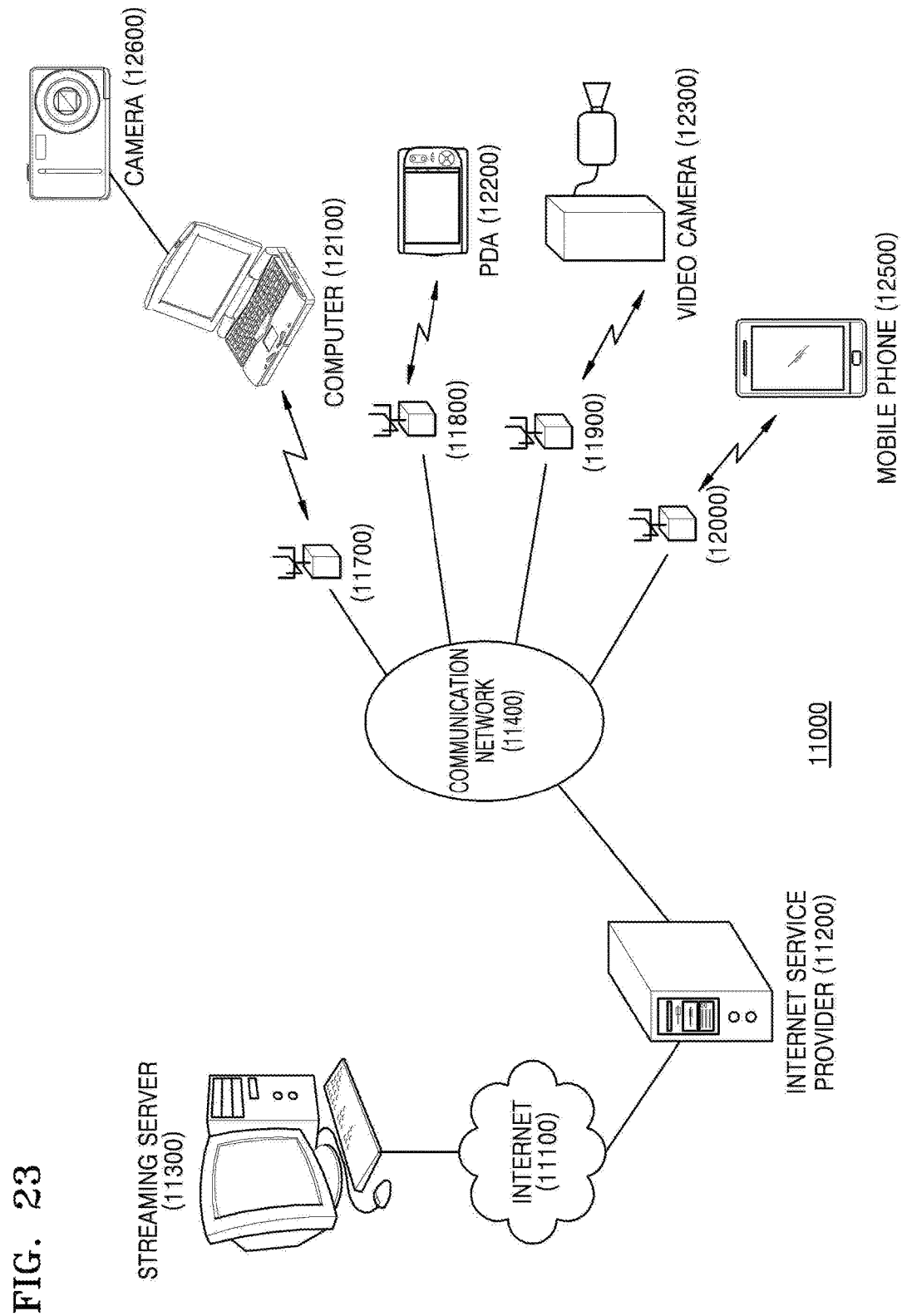
FIG. 23 illustrates a diagram of an overall structure of a content supply system for providing a content distribution service.

A prediction unit 910 for prediction encoding a coding unit 900 having a depth of 0 and a size of 2N_0×2N_0 may include partitions of a partition mode 912 having a size of 2N_0×2N_0, a partition mode 914 having a size of 2N_0×N_0, a partition mode 916 having a size of N_0×2N_0, and a partition mode 918 having a size of N_0×N_0. FIG. 23 only illustrates the partition modes 912 through 918 which are obtained by symmetrically splitting the prediction unit 910, but a partition mode is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition mode.

The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error is smallest in one of the partition modes 912, 914, and 916 having the sizes of 2N_0×2N_0, 2N_0×N_0 and N_0×2N_0, the prediction unit 910 may not be split into a lower depth.

If the encoding error is the smallest in the partition mode 918 having the size of N_0×N_0, a depth is changed from 0 to 1 to split the partition mode 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition mode 942 having a size of 2N_1×2N_1, a partition mode 944 having a size of 2N_1×N_1, a partition mode 946 having a size of N_1×2N_1, and a partition mode 948 having a size of N_1×N_1.

If an encoding error is the smallest in the partition mode 948 having the size of N_1×N_1, a depth is changed from 1 to 2 to split the partition mode 948 in operation 950, and encoding is repeatedly performed on coding units 960, which have a depth of 2 and a size of N_2×N_2 to search for a minimum encoding error.

When a maximum depth is d, split operation according to each depth may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition mode 992 having a size of 2N_(d−1)×2N_(d−1), a partition mode 994 having a size of 2N_(d−1)×N_(d−1), a partition mode 996 having a size of N_(d−1)×2N_(d−1), and a partition mode 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition modes 992 through 998 to search for a partition mode having a minimum encoding error.

Even when the partition mode 998 having the size of N_(d−1)×N_(d−1) has the minimum encoding error, since a maximum depth is d, a coding unit CU_(d−1) having a depth of d−1 is no longer split into a lower depth, and a depth for the coding units constituting a current largest coding unit 900 is determined to be d−1 and a partition mode of the current largest coding unit 900 may be determined to be N_(d−1)×N_(d−1). Also, since the maximum depth is d, split information for the coding unit 952 having a depth of d−1 is not set.

A data unit 999 may be a 'minimum unit' for the current largest coding unit. A minimum unit according to the embodiment may be a square data unit obtained by splitting a minimum coding unit 980 having a lowermost depth by 4. By performing the encoding repeatedly, the video encoding apparatus 100 according to the embodiment may select a depth having the least encoding error by comparing encoding errors according to depths of the coding unit 900 to determine a depth, and set a corresponding partition mode and a prediction mode as an encoding mode of the depth.

As such, the minimum encoding errors according to depths are compared in all of the depths of 0, 1, . . . , d−1, d, and a depth having the least encoding error may be determined as a depth. The depth, the partition mode of the prediction unit, and the prediction mode may be encoded and transmitted as split information. Also, since a coding unit is split from a depth of 0 to a depth, only split information of the depth is set to '0', and split information of depths excluding the depth is set to '1'.

The image data and encoding information extractor 220 of the video decoding apparatus 200 according to the embodiment may extract and use the information about the depth and the prediction unit of the coding unit 900 to decode the partition 912. The video decoding apparatus 200 according to the embodiment may determine a depth, in which split information is '0', as a depth by using split information according to depths, and use split information of the corresponding depth for decoding.

units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. That is, the video encoding apparatus 100 according to the present embodiment and the video decoding apparatus 200 according to the present embodiment may perform intra prediction/motion estimation/motion compensation/and transformation/inverse transformation individually on a data unit in the same coding unit.

Accordingly, encoding is recursively performed on each of coding units having a hierarchical structure in each region of a largest coding unit to determine an optimum coding unit, and thus coding units having a recursive tree structure may be obtained. Encoding information may include split information about a coding unit, information about a partition mode, information about a prediction mode, and information about a size of a transformation unit. Table 1 below shows the encoding information that may be set by the video encoding apparatus 100 and the video decoding apparatus 200 according to the embodiments.

TABLE 1

| | Split Information 0 (Encoding on Coding Unit having Size of 2N × 2N and Current Depth of d) | | | | |
|---|---|---|---|---|---|
| | | | Size of Transformation Unit | | |
| Prediction Mode | Partition mode | | Split Information 0 of Transformation Unit | Split Information 1 of Transformation Unit | Split Information 1 |
| Intra Inter | Symmetrical Partition mode | Asymmetrical Partition mode | | | |
| Skip (Only 2N × 2N) | 2N × 2N 2N × N N × 2N N × N | 2N × nU 2N × nD nL × 2N nR × 2N | 2N × 2N | N × N (Symmetrical Partition mode) N/2 × N/2 (Asymmetrical Partition mode) | Repeatedly Encode Coding Units having Lower Depth of d + 1 |

Figure 17:
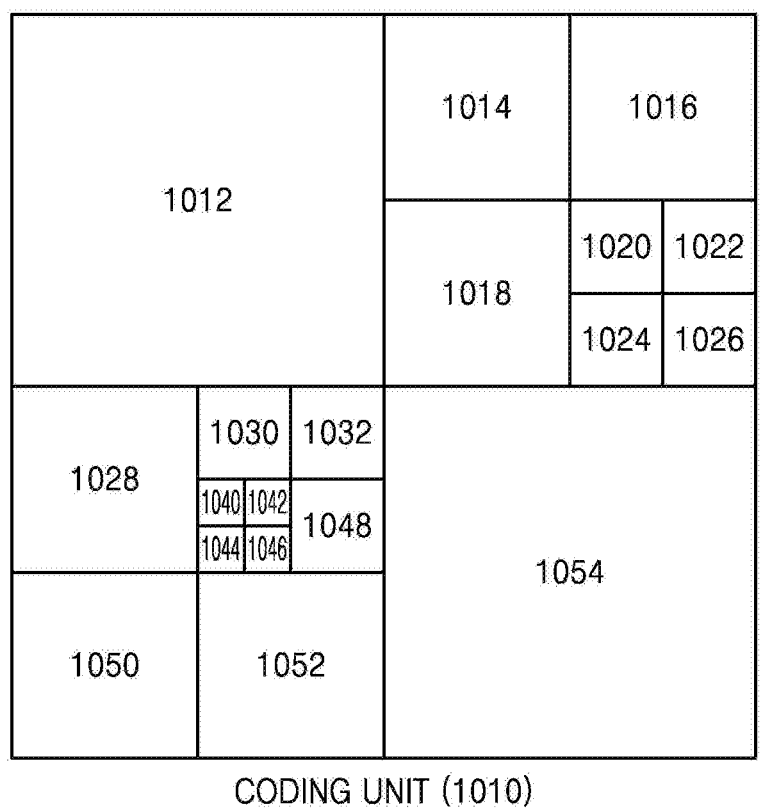
FIGS. 17, 18, and 19 are diagrams for describing a relationship between coding units, prediction units, and transformation units, according to embodiments of the present invention.
Figure 18:
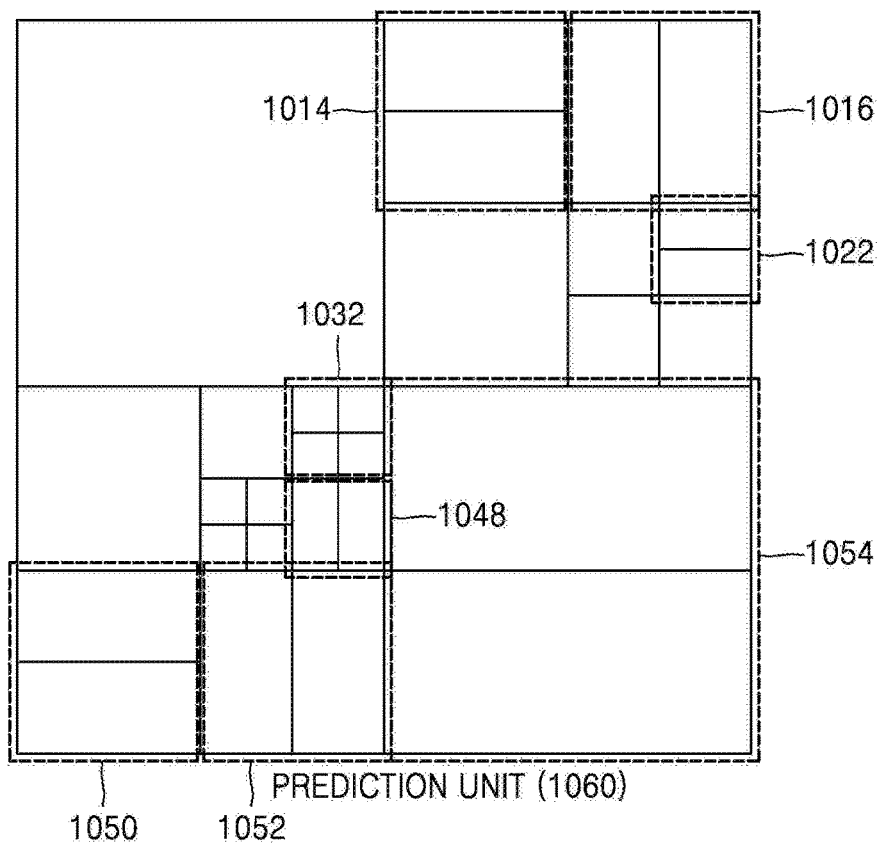
Figure 19:
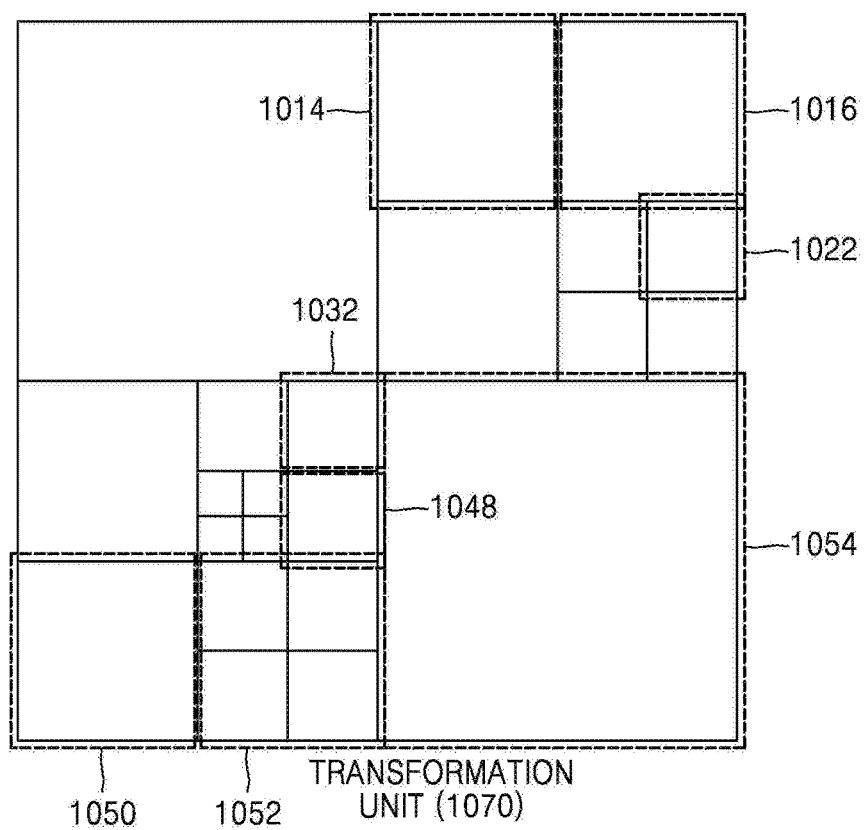

FIGS. 17, 18, and 19 are diagrams for describing a relationship between coding units, prediction units, and transformation units, according to various embodiments.

Coding units 1010 are deeper coding units according to depths determined by the video encoding apparatus 100, in a largest coding unit. Prediction units 1060 are partitions of prediction units of each of the coding units 1010, and transformation units 1070 are transformation units of each of the coding units 1010.

When a depth of a largest coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoders 1014, 1016, 1022, 1032, 1048, 1050, 1052, and 1054 are obtained by splitting the coding units in the encoders 1010. That is, partition modes in the coding units 1014, 1022, 1050, and 1054 have a size of 2N×N, partition modes in the coding units 1016, 1048, and 1052 have a size of N×2N, and a partition mode of the coding unit 1032 has a size of N×N. Prediction units and partitions of the coding units 1010 are smaller than or equal to each coding unit.

Transformation or inverse transformation is performed on image data of the coding unit 1052 in the transformation The output unit 130 of the video encoding apparatus 100 according to the present embodiment may output the encoding information about the coding units having a tree structure, and the image data and encoding information extractor 220 of the video decoding apparatus 200 according to the embodiment may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a depth, and thus information about a partition mode, prediction mode, and a size of a transformation unit may be defined for the depth. If the current coding unit is further split according to the split information, encoding is independently performed on four split coding units of a lower depth.

A prediction mode may be one of an intra mode, an inter mode, and a skip mode. The intra mode and the inter mode may be defined in all partition modes, and the skip mode is defined only in a partition mode having a size of 2N×2N.

The information about the partition mode may indicate symmetrical partition modes having sizes of 2N×2N, 2N×N, N×2N, and N×N, which are obtained by symmetrically splitting a height or a width of a prediction unit, and asymmetrical partition modes having sizes of 2N×nU, 2N×nD, nL×2N, and nR×2N, which are obtained by asymmetrically splitting the height or width of the prediction unit. The asymmetrical partition modes having the sizes of 2N×nU and 2N×nD may be respectively obtained by splitting the height of the prediction unit in 1:3 and 3:1, and the asymmetrical partition modes having the sizes of nL×2N and nR×2N may be respectively obtained by splitting the width of the prediction unit in 1:3 and 3:1.

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition mode of the current coding unit having the size of 2N×2N is a symmetrical partition mode, a size of a transformation unit may be N×N, and if the partition mode of the current coding unit is an asymmetrical partition mode, the size of the transformation unit may be N/2×N/2.

The encoding information about coding units having a tree structure according to the embodiment may be assigned to at least one selected from a coding unit corresponding to a depth, a prediction unit, and a minimum unit. The coding unit corresponding to the depth may include at least one selected from a prediction unit and a minimum unit containing the same encoding information.

Accordingly, it is determined whether adjacent data units are included in the same coding unit corresponding to the final depth by comparing encoding information of the adjacent data units. Also, a corresponding coding unit corresponding to a final depth is determined by using encoding information of a data unit, and thus a distribution of final depths in a largest coding unit may be determined.

Accordingly, if a current coding unit is predicted based on encoding information of adjacent data units, encoding information of data units in deeper coding units adjacent to the current coding unit may be directly referred to and used.

In another embodiment, if a current coding unit is predicted based on encoding information of adjacent data units, data units adjacent to the current coding unit are searched using encoded information of the data units, and the searched adjacent coding units may be referred for predicting the current coding unit.

Figure 20:
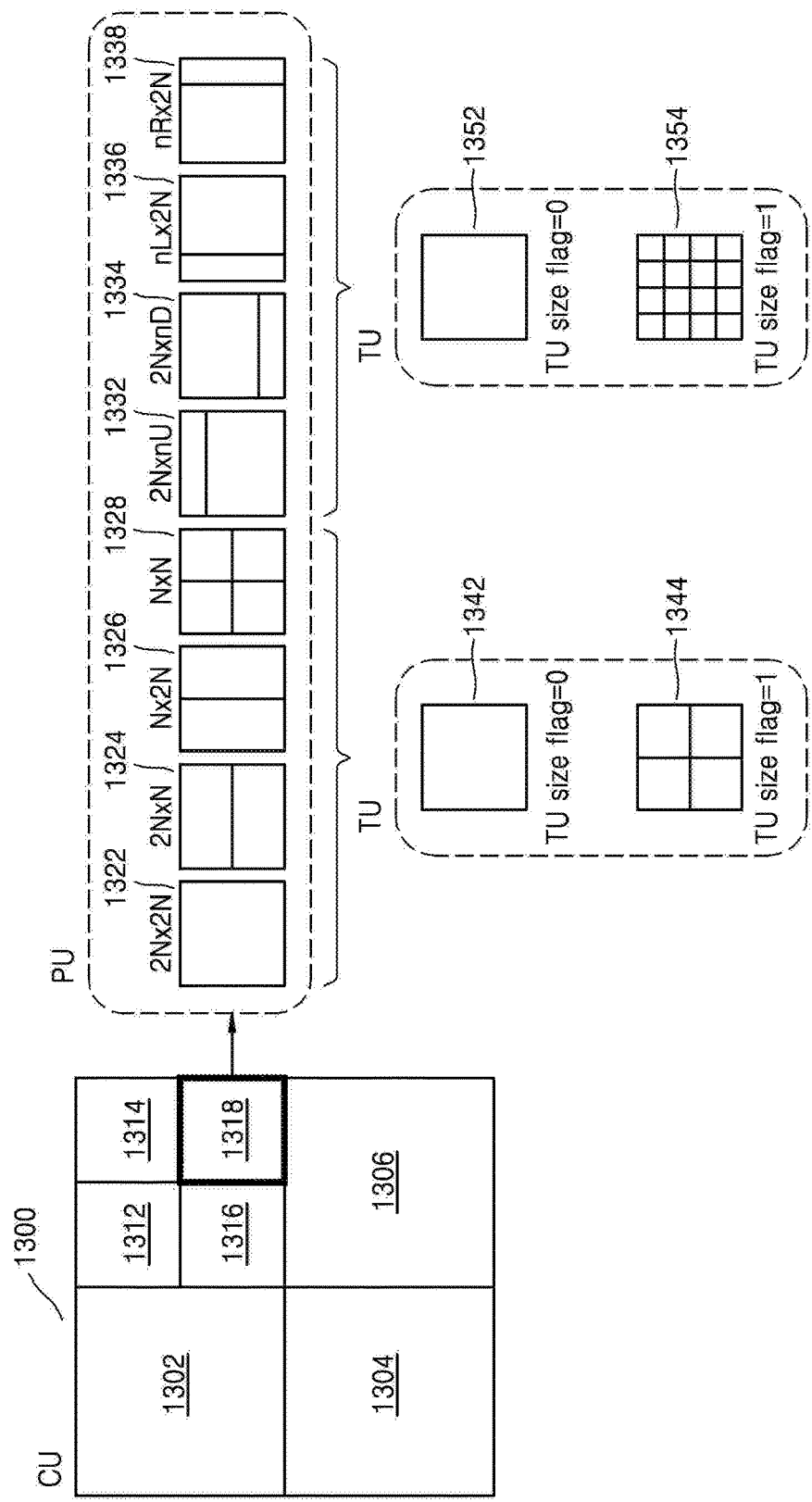
FIG. 20 illustrates a diagram for describing a relationship between a coding unit, a prediction unit, and a transformation unit, according to encoding mode information of Table 1.

FIG. 20 illustrates a diagram for describing a relationship between a coding unit, a prediction unit, and a transformation unit, according to encoding mode information of Table 1.

A largest coding unit 1300 includes coding units 1302, 1304, 1306, 1312, 1314, 1316, and 1318 of depths. Here, since the coding unit 1318 is a coding unit of a depth, split information may be set to 0. Information about a partition mode of the coding unit 1318 having a size of 2N×2N may be set to be one of partition modes including 2N×2N 1322, 2N×N 1324, N×2N 1326, N×N 1328, 2N×nU 1332, 2N×nD 1334, nL×2N 1336, and nR×2N 1338.

Transformation unit split information (TU size flag) is a type of a transformation index. A size of a transformation unit corresponding to the transformation index may be changed according to a prediction unit type or partition mode of the coding unit.

For example, when the information about the partition mode is set to be one of symmetrical partition modes 2N×2N 1322, 2N×N 1324, N×2N 1326, and N×N 1328, if the transformation unit split information is 0, a transformation unit 1342 having a size of 2N×2N is set, and if the transformation unit split information is 1, a transformation unit 1344 having a size of N×N is set.

When the information about the partition mode is set to be one of asymmetrical partition modes 2N×nU 1332, 2N×nD 1334, nL×2N 1336, and nR×2N 1338, if the transformation unit split information is 0, a transformation unit 1352 having a size of 2N×2N may be set, and if the transformation unit split information is 1, a transformation unit 1354 having a size of N/2×N/2 may be set.

As described above with reference to FIG. 19, the transformation unit split information (TU size flag) is a flag having a value or 0 or 1, but the transformation unit split information is not limited to a flag having 1 bit, and the transformation unit may be hierarchically split while the transformation unit split information increases in a manner of 0, 1, 2, 3 . . . etc., according to setting. The transformation unit split information may be an example of the transformation index.

In this case, the size of a transformation unit that has been actually used may be expressed by using the transformation unit split information according to the embodiment, together with a maximum size of the transformation unit and a minimum size of the transformation unit. The video encoding apparatus 100 according to the embodiment is capable of encoding maximum transformation unit size information, minimum transformation unit size information, and maximum transformation unit split information. The result of encoding the maximum transformation unit size information, the minimum transformation unit size information, and the maximum transformation unit split information may be inserted into an SPS. The video decoding apparatus 200 according to the embodiment may decode video by using the maximum transformation unit size information, the minimum transformation unit size information, and the maximum transformation unit split information.

For example, (a) if the size of a current coding unit is 64×64 and a maximum transformation unit size is 32×32, (a–1) then the size of a transformation unit may be 32×32 when a TU size flag is 0, (a–2) may be 16×16 when the TU size flag is 1, and (a–3) may be 8×8 when the TU size flag is 2.

As another example, (b) if the size of the current coding unit is 32×32 and a minimum transformation unit size is 32×32, (b–1) then the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit may be defined by Equation (1):

$$\text{CurrMinTuSize}=\max(\text{MinTransformSize}, \text{RootTuSize}/(2^{\text{MaxTransformSizeIndex}})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. That is, in Equation (1), 'RootTuSize/(2^MaxTransformSizeIndex)' denotes a transformation unit size when the transformation unit size 'RootTuSize', when the TU size flag is 0, is split by the number of times corresponding to the maximum TU size flag, and 'MinTransformSize' denotes a minimum transformation size. Thus, a smaller value from among 'RootTuSize/ (2^MaxTransformSizeIndex)' and 'MinTransformSize' may be the current minimum transformation unit size 'CurrMinTuSize' that can be determined in the current coding unit.

According to an embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$RootTuSize=\min(MaxTransformSize, PUSize) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$RootTuSize=\min(MaxTransformSize, PartitionSize) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an embodiment, and a factor for determining the current maximum transformation unit size is not limited thereto.

According to the video encoding method based on coding units of a tree structure described above with reference to FIGS. 8 through 20, image data of a spatial domain is encoded in each of the coding units of the tree structure, and the image data of the spatial domain is reconstructed in a manner that decoding is performed on each largest coding unit according to the video decoding method based on the coding units of the tree structure, so that a video that is formed of pictures and pictures sequences may be reconstructed. The reconstructed video may be reproduced by a reproducing apparatus, may be stored in a storage medium, or may be transmitted via a network.

The one or more embodiments can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), etc.

For convenience of description, the aforementioned video encoding methods and/or video encoding methods are collectively referred to as 'the video encoding method of the present invention'. Also, the aforementioned video decoding methods and/or video decoding methods are referred to as 'the video decoding method of the present invention'.

Also, a video encoding apparatus including the video encoding apparatus 40, the video encoding apparatus 100, or the image encoder 400 is collectively referred as a 'video encoding apparatus of the present invention'. Also, a video decoding apparatus including the device 10, the video decoding apparatus 200, or the image decoder 500 is collectively referred to as a 'video decoding apparatus of the present invention'.

A computer-readable recording medium storing a program, e.g., a disc 26000, according to an embodiment will now be described in detail.

Figure 21:
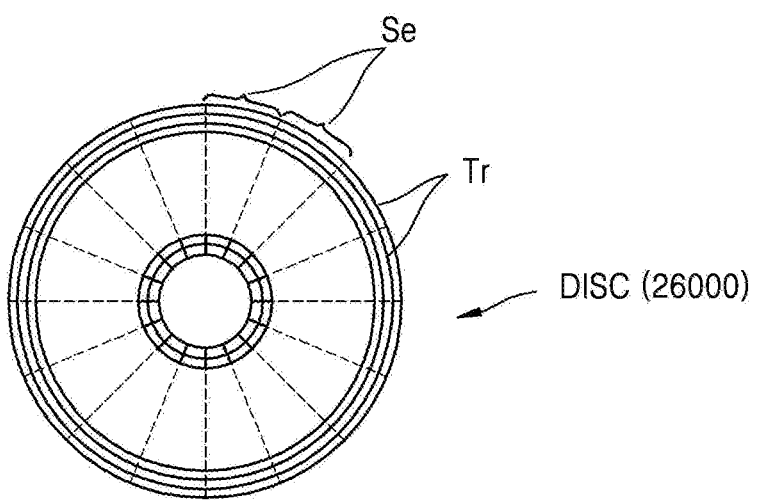
FIG. 21 illustrates a diagram of a physical structure of a disc in which a program is stored, according to an embodiment.

FIG. 21 illustrates a diagram of a physical structure of the disc 26000 in which a program is stored, according to various embodiments. The disc 26000, which is a storage medium, may be a hard drive, a compact disc-read only memory (CD-ROM) disc, a Blu-ray disc, or a digital versatile disc (DVD). The disc 26000 includes a plurality of concentric tracks Tr that are each divided into a specific number of sectors Se in a circumferential direction of the disc 26000. In a specific region of the disc 26000, a program that executes the quantized parameter determining method, the video encoding method, and the video decoding method described above may be assigned and stored.

A computer system embodied using a storage medium that stores a program for executing the video encoding method and the video decoding method as described above will now be described with reference to FIG. 22.

Figure 22:
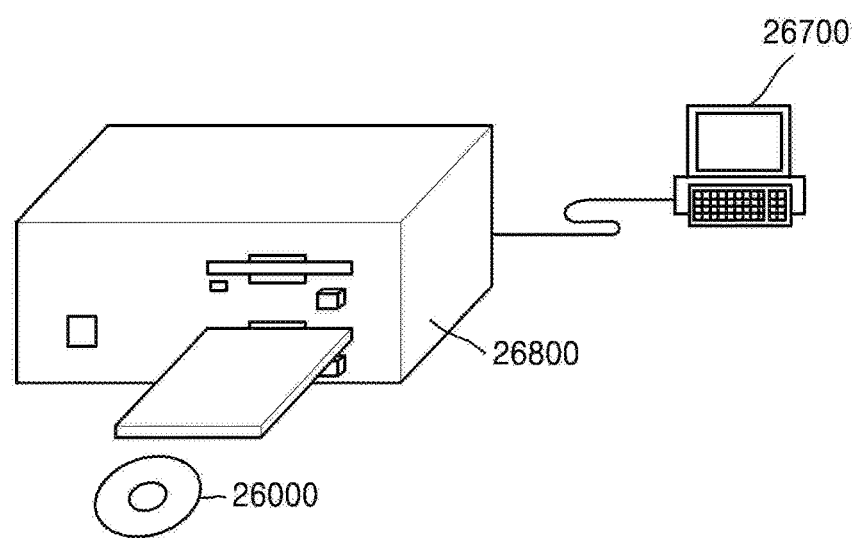
FIG. 22 illustrates a diagram of a disc drive for recording and reading a program by using the disc.

FIG. 22 illustrates a diagram of a disc drive 26800 for recording and reading a program by using the disc 26000. A computer system 26700 may store a program that executes at least one selected from a video encoding method and a video decoding method according to an embodiment, in the disc 26000 via the disc drive 26800. To run the program stored in the disc 26000 in the computer system 26700, the program may be read from the disc 26000 and be transmitted to the computer system 26700 by using the disc drive 26800.

The program that executes at least one selected from a video encoding method and a video decoding method according to an embodiment may be stored not only in the disc 26000 illustrated in FIGS. 21 and 22 but also may be stored in a memory card, a ROM cassette, or a solid state drive (SSD).

A system to which the video encoding method and the video decoding method described above are applied will be described below.

FIG. 23 illustrates a diagram of an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

However, the content supply system 11000 is not limited to as illustrated in FIG. 23, and devices may be selectively connected thereto. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded using the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 is an imaging device capable of capturing both still images and video images, similar to a digital camera. The video data captured by the camera 12600 may be encoded using the camera 12600 or the computer 12100. Software that performs encoding and decoding video may be stored in a computer-readable recording medium, e.g., a CD-ROM disc, a floppy disc, a hard disc drive, an SSD, or a memory card, which may be accessible by the computer 12100.

If video data is captured by a camera built in the mobile phone 12500, the video data may be received from the mobile phone 12500.

The video data may also be encoded by a large scale integrated circuit (LSI) system installed in the video camera 12300, the mobile phone 12500, or the camera 12600.

The content supply system 11000 may encode content data recorded by a user using the video camera 12300, the camera 12600, the mobile phone 12500, or another imaging device, e.g., content recorded during a concert, and transmit the encoded content data to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real time, thereby enabling personal broadcasting.

Encoding and decoding operations of the plurality of independent devices included in the content supply system 11000 may be similar to those of a video encoding apparatus and a video decoding apparatus according to embodiments.

Figure 24:
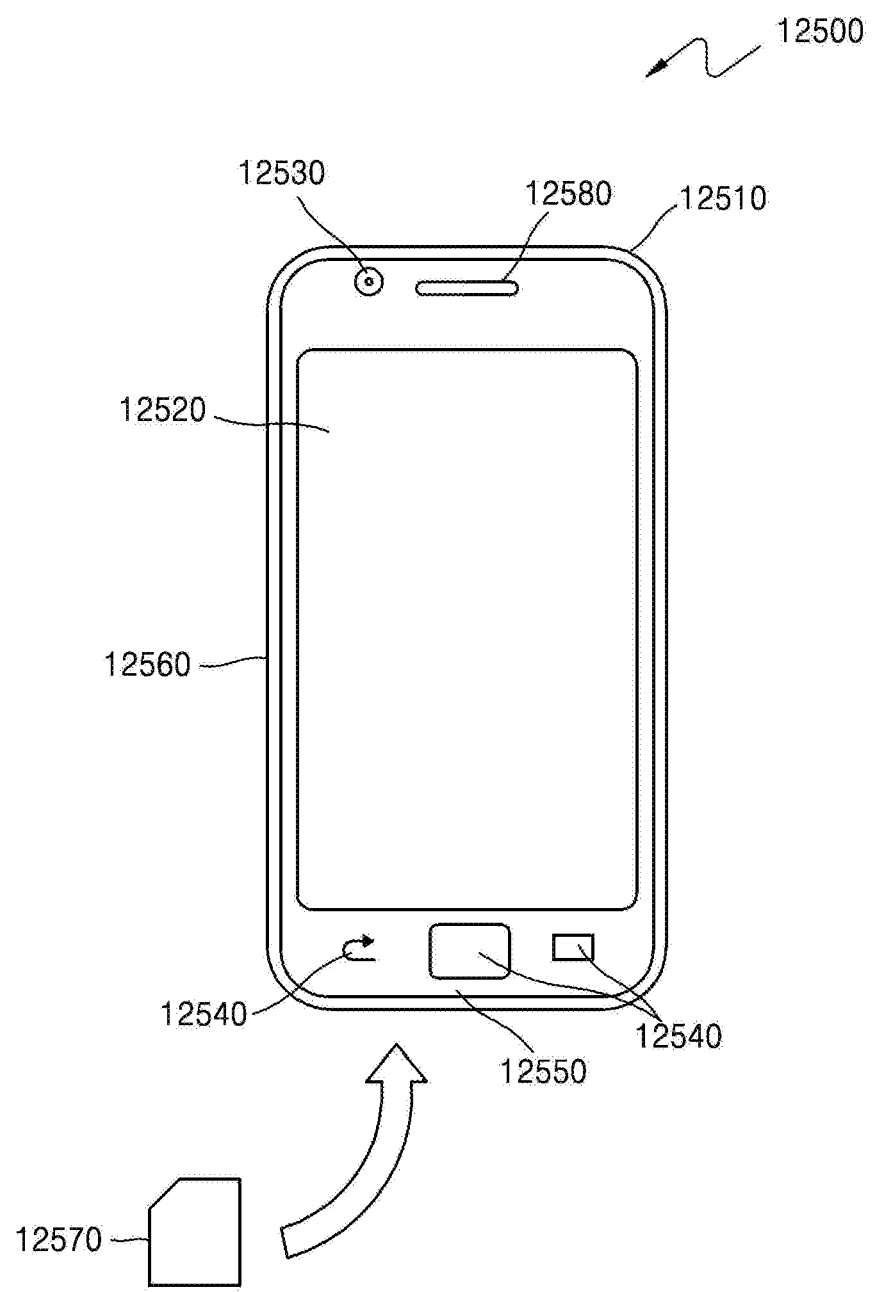
FIGS. 24 and 25 illustrate external and internal structures of a mobile phone to which a video encoding method and a video decoding method are applied, according to embodiments.
Figure 25:
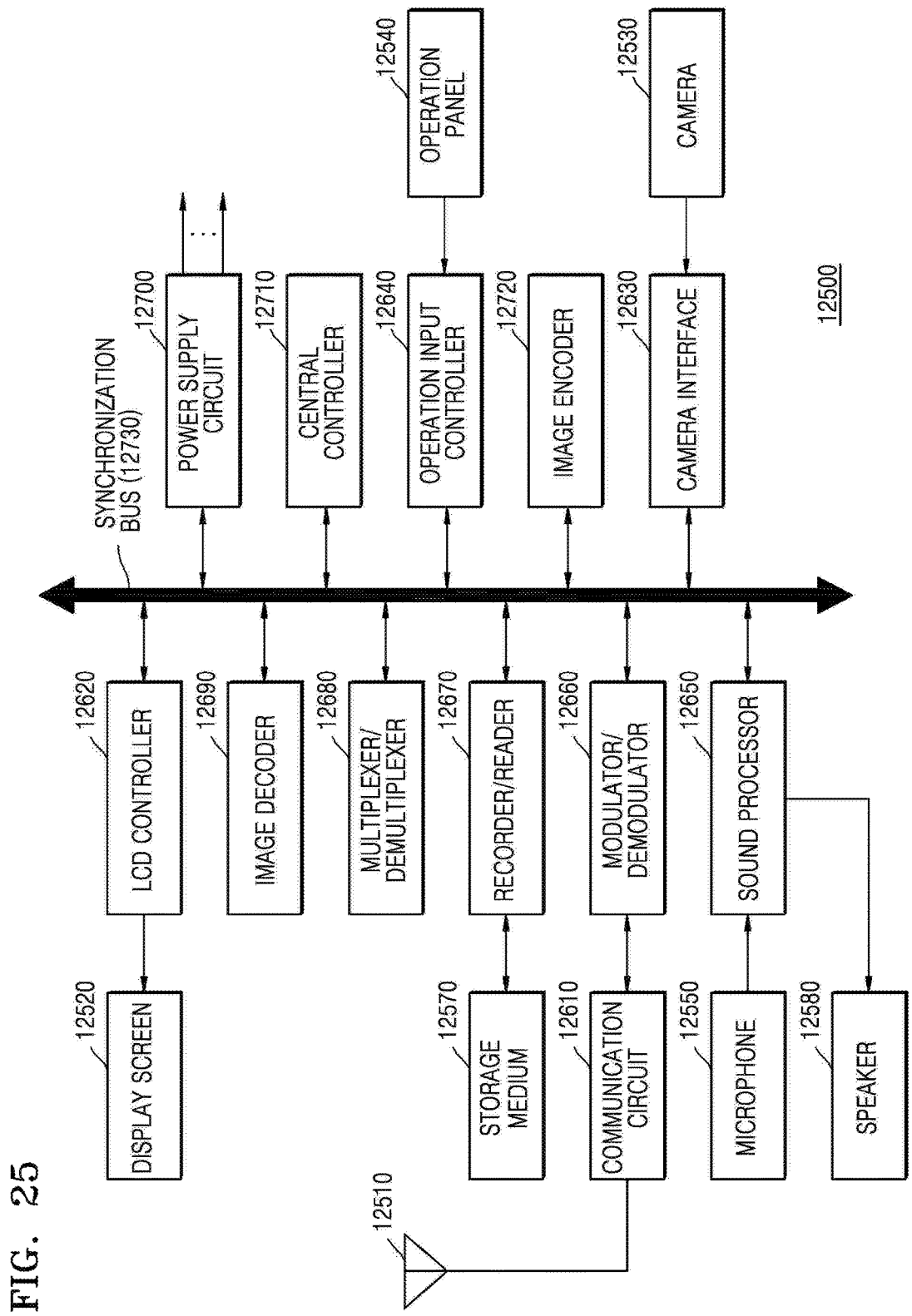

With reference to FIGS. 24 and 25, the mobile phone 12500 included in the content supply system 11000 according to an embodiment will now be described in detail.

FIG. 24 illustrates an external structure of the mobile phone 12500 to which a video encoding method and a video decoding method are applied, according to various embodiments. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000, and includes a display screen 12520 for displaying images captured by a camera 12530 or images that are received via the antenna 12510 and decoded, e.g., a liquid crystal display (LCD) or an organic light-emitting diode (OLED) screen.

The mobile phone 12500 includes an operation panel 12540 including a control button and a touch panel. If the display screen 12520 is a touch screen, the operation panel 12540 further includes a touch sensing panel of the display screen 12520. The mobile phone 12500 includes a speaker 12580 for outputting voice and sound or another type of a sound output unit, and a microphone 12550 for inputting voice and sound or another type of a sound input unit. The mobile phone 12500 further includes the camera 12530, such as a charge-coupled device (CCD) camera, to capture video and still images. The mobile phone 12500 may further include a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

FIG. 25 illustrates an internal structure of the mobile phone 12500. In order to systemically control parts of the mobile phone 12500 including the display screen 12520 and the operation panel 12540, a power supply circuit 12700, an operation input controller 12640, an image encoder 12720, a camera interface 12630, an LCD controller 12620, an image decoder 12690, a multiplexer/demultiplexer 12680, a recording/reading unit 12670, a modulation/demodulation unit 12660, and a sound processor 12650 are connected to a central controller 12710 via a synchronization bus 12730.

If a user operates a power button and sets from a 'power off' state to a 'power on' state, the power supply circuit 12700 supplies power to all the parts of the mobile phone 12500 from a battery pack, thereby setting the mobile phone 12500 to an operation mode.

The central controller 12710 includes a central processing unit (CPU), a ROM, and a RAM.

While the mobile phone 12500 transmits communication data to the outside, a digital signal is generated by the mobile phone 12500 under control of the central controller 12710. For example, the sound processor 12650 may generate a digital sound signal, the image encoder 12720 may generate a digital image signal, and text data of a message may be generated via the operation panel 12540 and the operation input controller 12640. When a digital signal is transmitted to the modulation/demodulation unit 12660 by control of the central controller 12710, the modulation/demodulation unit 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is transformed into a digital sound signal by the sound processor 12650, by control of the central controller 12710. The digital sound signal may be transformed into a transformation signal via the modulation/demodulation unit 12660 and the communication circuit 12610, and may be transmitted via the antenna 12510.

When a text message, e.g., email, is transmitted during a data communication mode, text data of the text message is input via the operation panel 12540 and is transmitted to the central controller 12610 via the operation input controller 12640. By control of the central controller 12610, the text data is transformed into a transmission signal via the modulation/demodulation unit 12660 and the communication circuit 12610 and is transmitted to the wireless base station 12000 via the antenna 12510.

In order to transmit image data during the data communication mode, image data captured by the camera 12530 is provided to the image encoder 12720 via the camera interface 12630. The captured image data may be directly displayed on the display screen 12520 via the camera interface 12630 and the LCD controller 12620.

A structure of the image encoder 12720 may correspond to that of the video encoding apparatus 100 described above. The image encoder 12720 may transform the image data received from the camera 12530 into compressed and encoded image data according to the aforementioned video encoding method, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the image encoder 12720, together with the sound data received from the sound processor 12650. A result of multiplexing the data may be transformed into a transmission signal via the modulation/demodulation unit 12660 and the communication circuit 12610, and may then be transmitted via the antenna 12510.

While the mobile phone 12500 receives communication data from the outside, frequency recovery and ADC are performed on a signal received via the antenna 12510 to transform the signal into a digital signal. The modulation/demodulation unit 12660 modulates a frequency band of the digital signal. The frequency-band modulated digital signal is transmitted to the video decoder 12690, the sound processor 12650, or the LCD controller 12620, according to the type of the digital signal.

During the conversation mode, the mobile phone 12500 amplifies a signal received via the antenna 12510, and obtains a digital sound signal by performing frequency conversion and ADC on the amplified signal. A received digital sound signal is transformed into an analog sound signal via the modulation/demodulation unit 12660 and the sound processor 12650, and the analog sound signal is output via the speaker 12580, by control of the central controller 12710.

When during the data communication mode, data of a video file accessed at an Internet website is received, a signal received from the wireless base station 12000 via the antenna 12510 is output as multiplexed data via the modulation/demodulation unit 12660, and the multiplexed data is transmitted to the multiplexer/demultiplexer 12680.

In order to decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the video decoder 12690 and the sound processor 12650, respectively.

A structure of the image decoder 12690 may correspond to that of the video decoding apparatus described above. The image decoder 12690 may decode the encoded video data to obtain reconstructed video data and provide the reconstructed video data to the display screen 12520 via the LCD controller 12620, by using the aforementioned video decoding method according to the embodiment.

Thus, the data of the video file accessed at the Internet website may be displayed on the display screen 12520. At the same time, the sound processor 12650 may transform audio data into an analog sound signal, and provide the analog sound signal to the speaker 12580. Thus, audio data contained in the video file accessed at the Internet website may also be reproduced via the speaker 12580.

The mobile phone 12500 or another type of communication terminal may be a transceiving terminal including both a video encoding apparatus and a video decoding apparatus according to an embodiment, may be a transmitting terminal including only the video encoding apparatus, or may be a receiving terminal including only the video decoding apparatus.

Figure 26:
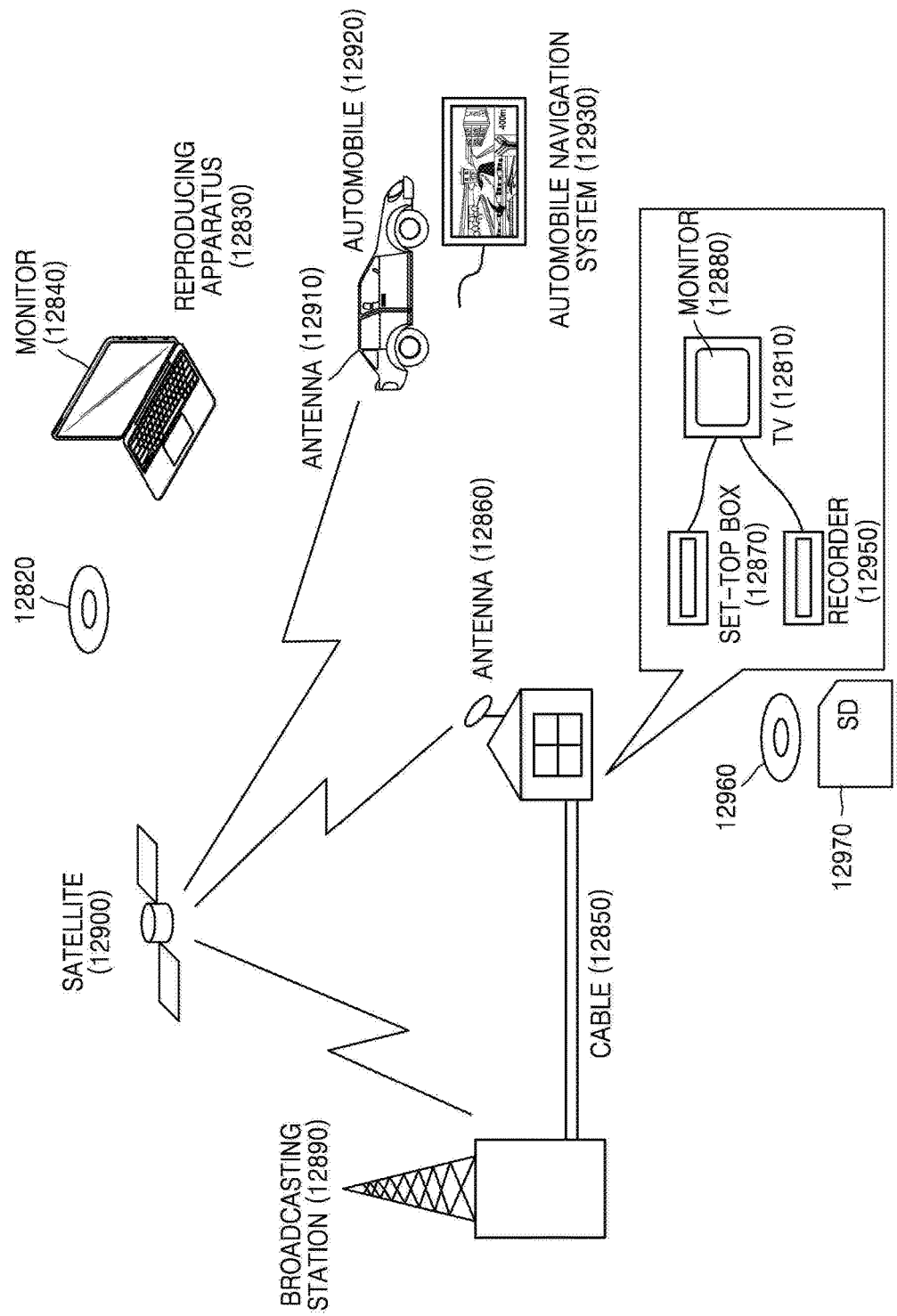
FIG. 26 illustrates a digital broadcasting system employing a communication system, according to an embodiment of the present invention.

A communication system according to an embodiment is not limited to the communication system described above with reference to FIG. 24. For example, FIG. 26 illustrates a digital broadcasting system employing a communication system, according to various embodiments. The digital broadcasting system of FIG. 26 may receive a digital broadcast transmitted via a satellite or a terrestrial network by using the video encoding apparatus and the video decoding apparatus according to the embodiments.

In more detail, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded videostream may be decoded and reproduced by a TV receiver 12810, a set-top box 12870, or another device.

When the video decoding apparatus according to the embodiment is implemented in a reproducing apparatus 12830, the reproducing apparatus 12830 may parse and decode an encoded videostream recorded on a storage medium 12820, such as a disc or a memory card to reconstruct digital signals. Thus, the reconstructed video signal may be reproduced, for example, on a monitor 12840.

In the set-top box 12870 connected to the antenna 12860 for a satellite/terrestrial broadcast or a cable antenna 12850 for receiving a cable television (TV) broadcast, the video decoding apparatus according to the embodiment may be installed. Data output from the set-top box 12870 may also be reproduced on a TV monitor 12880.

As another example, the video decoding apparatus according to the embodiment may be installed in the TV receiver 12810 instead of the set-top box 12870.

An automobile 12920 that has an appropriate antenna 12910 may receive a signal transmitted from the satellite 12900 or the wireless base station 11700. A decoded video may be reproduced on a display screen of an automobile navigation system 12930 installed in the automobile 12920.

A video signal may be encoded by the video encoding apparatus according to the embodiment and may then be stored in a storage medium. In more detail, an image signal may be stored in a DVD disc 12960 by a DVD recorder or may be stored in a hard disc by a hard disc recorder 12950. As another example, the video signal may be stored in an SD card 12970. If the hard disc recorder 12950 includes the video decoding apparatus according to the embodiment, a video signal recorded on the DVD disc 12960, the SD card 12970, or another storage medium may be reproduced on the TV monitor 12880.

The automobile navigation system 12930 may not include the camera 12530, the camera interface 12630, and the image encoder 12720 of FIG. 25. For example, the computer 12100 and the TV receiver 12810 may not include the camera 12530, the camera interface 12630, and the image encoder 12720 of FIG. 25.

Figure 27:
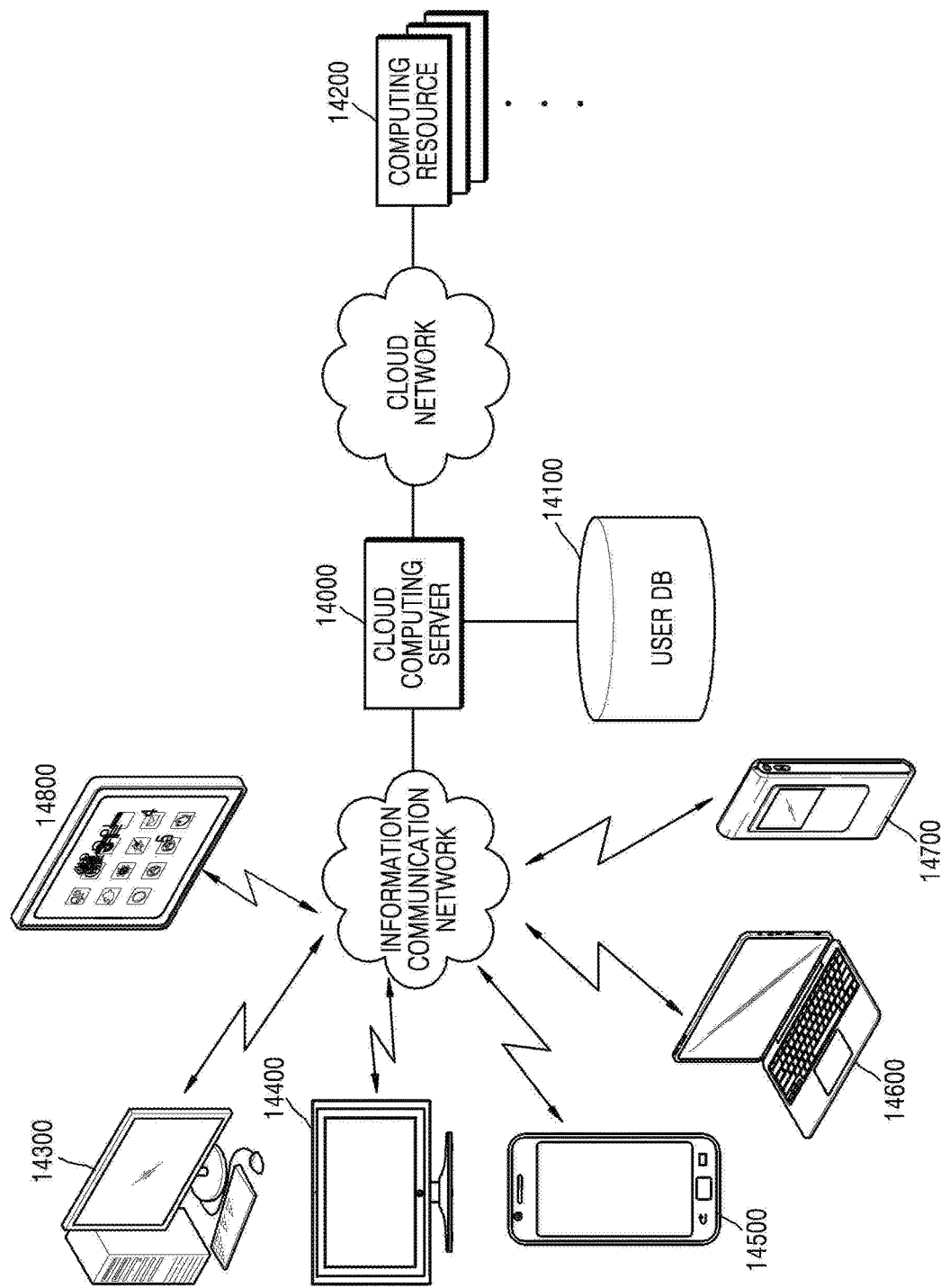
FIG. 27 is a diagram illustrating a network structure of a cloud computing system using a video encoding apparatus and a video decoding apparatus, according to an embodiment of the present invention.

FIG. 27 is a diagram illustrating a network structure of a cloud computing system using a video encoding apparatus and a video decoding apparatus, according to various embodiments.

The cloud computing system may include a cloud computing server 14000, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security software, into his/her own terminal in order to use them, but may select and use desired services from among services in a virtual space generated through the virtualization technology, at a desired point in time.

A user terminal of a specified service user is connected to the cloud computing server 14000 via a data communication network including the Internet and a mobile telecommunication network. User terminals may be provided cloud computing services, and particularly video reproduction services, from the cloud computing server 14000. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 14800, and the like.

The cloud computing server 14000 may combine the plurality of computing resources 14200 distributed in a cloud network and provide user terminals with a result of combining. The plurality of computing resources 14200 may include various data services, and may include data uploaded from user terminals. As described above, the cloud computing server 14000 may provide user terminals with desired services by combining video database distributed in different regions according to the virtualization technology.

User information about users who have subscribed for a cloud computing service is stored in the user DB 14100. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce the video service is received from the smart phone 14500, the cloud computing server 14000 searches for and reproduces the video service, based on the user DB 14100. When the smart phone 14500 receives a video data stream from the cloud computing server 14000, a process of reproducing video by decoding the video data stream is similar to an operation of the mobile phone 12500 described above with reference to FIG. 24.

The cloud computing server 14000 may refer to a reproduction history of a desired video service, stored in the user DB 14100. For example, the cloud computing server 14000 receives a request to reproduce a video stored in the user DB 14100, from a user terminal. If this video was being reproduced, then a method of streaming this video, performed by the cloud computing server 14000, may vary according to the request from the user terminal, i.e., according to whether the video will be reproduced, starting from a start thereof or a pausing point thereof. For example, if the user terminal requests to reproduce the video, starting from the start thereof, the cloud computing server 14000 transmits streaming data of the video starting from a first frame thereof to the user terminal. If the user terminal requests to reproduce the video, starting from the pausing point thereof, the cloud computing server 14000 transmits streaming data of the video starting from a frame corresponding to the pausing point, to the user terminal.

In this case, the user terminal may include the aforementioned video decoding apparatus of the present invention. In another example, the user terminal may include the video encoding apparatus of the present invention. Alternatively, the user terminal may include both the video decoding apparatus and the video encoding apparatus of the present invention.

Various applications of the video encoding method, the video decoding method, the video encoding apparatus, and the video decoding apparatus are described above with reference to FIGS. 21 through 27. However, methods of storing the video encoding method and the video decoding method in a storage medium or methods of implementing the video encoding apparatus and the video decoding apparatus in a device are not limited to the embodiments described above with reference to FIGS. 21 through 27.

As described above, when the methods of improving performance of digital signal transformation, and the transform matrices according to various embodiments are used in digital signal transformation and digital signal processing, the transform matrices are determined based on exact limitation conditions. Compared to the related art, the digital signal transformation according to various embodiments has higher decorrelation capability and lower transform distortion.

The aforementioned various embodiments are not provided to limit the scope of the present invention. Thus, the invention may include all revisions, equivalents, or substitutions which are included in the concept and the technical scope related to the invention.

The aforementioned terms such as "include", "comprise", "configure", "have", or the like are used to mean that, unless there is a particular description contrary thereto, a corresponding element may be included therein, and other elements are not excluded and may also be further included therein.

The embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), etc.

While this present invention has been particularly shown and described with reference to embodiments thereof, it will be understood by those of ordinary skill in the art that various changes in form and details may be made therein without departing from the spirit and scope of the following claims. The embodiments should be considered in a descriptive sense only and not for purposes of limitation. Therefore, the scope of the present invention is defined not by the detailed description of the present invention but by the appended claims, and all differences within the scope will be construed as being included in the present invention.

What is claimed is:

1. An inverse-transforming method comprising:
    determining a transform block including transform coefficients;
    obtaining first transformed coefficients by applying a first transform matrix to the transform block and by performing right-shifting by a first number of bits;
    obtaining second transformed coefficients by applying a second transform matrix to the first transformed coefficients and by performing right-shifting by a second number of bits; and
    obtaining a residual block based on the second transformed coefficients,
    wherein the first number of bits and the second number of bits are separately predetermined,
    when the first transform matrix is a 4×4 matrix, elements of the first transform matrix are {{32, 32, 32, 32}; {42, 17, −17, −42}; {32, −32, −32, 32}; {17, −42, 42, −17}}, and
    when the first transform matrix is a 8×8 matrix, elements of the first transform matrix are {{32, 32, 32, 32, 32, 32, 32, 32}; {44, 38, 25, 9, −9, −25, −38, −44}; {42, 17, −17, −42, −42, −17, 17, 42}; {38, −9, −44, −25, 25, 44, 9, −38}; {32, −32, −32, 32, 32, −32, −32, 32}; {25, −44, 9, 38, −38, −9, 44, −25}; {17, −42, 42, −17, −17, 42, −42, 17}; {9, −25, 38, −44, 44, −38, 25, −9}}.

2. The inverse-transforming method of claim 1, wherein the first number of bits is different from the second number of bits.

3. An inverse-transforming apparatus comprising:
    a block determiner configured to determine a transform block including transform coefficients;
    a processor configured to obtain first transformed coefficients by applying a first transform matrix to the transform block and by performing right-shifting by a first number of bits, obtain second transformed coefficients by applying a second transform matrix to the first transformed coefficients and by performing right-shifting by a second number of bits, and obtain a residual block based on the second transformed coefficients,
    wherein the first number of bits and the second number of bits are separately predetermined,
    when the first transform matrix is a 4×4 matrix, end-elements of the first transform matrix are {{32, 32, 32, 32}; {42, 17, −17, −42}; {2, −32, −32, 32}; {17, −42, 42, −17}}, and
    when the first transform matrix is a 8×8 matrix, elements of the first transform matrix are {{32, 32, 32, 32, 32, 32, 32, 32}; {44, 38, 25, 9, −9, −25, −38, −44}; {42, 17, −17, −42, −42, −17, 17, 42}; {38, −9, −44, −25, 25, 44, 9, −38}; {32, −32, −32, 32, 32, −32, −32, 32}; {25, −44, 9, 38, −38, −9, 44, −25}; {17, −42, 42, −17, −17, 42, −42, 17}; {9, −25, 38, −44, 44, −38, 25, −9}}.

4. The inverse-transforming apparatus of claim 3, wherein the first number of bits is different from the second number of bits.

5. A transforming method comprising:
    determining a transform unit corresponding to a residual block;
    obtaining first transformed coefficients by applying a first transform matrix to the transform unit and by performing right-shifting by a first number of bits;
    obtaining second transformed coefficients by applying a second transform matrix to the first transformed coefficients and by performing right-shifting by a second number of bits; and
    obtaining a transform block including transform coefficients based on the second transformed coefficients,
    wherein the first number of bits and the second number of bits are separately predetermined,
    when the first transform matrix is a 4×4 matrix, elements of the first transform matrix are {{2, 32, 32, 32}; {42, 17, −17, −42}; {32, −32, −32, 32}; {17, −42, 42, −17}} or a transposed elements of {{32, 32, 32, 32}; {42, 17, −17, −42}; {32, −32, −32, 32}; {17, −42, 42, −17}}, and
    when the first transform matrix is a 8×8 matrix, elements of the first transform matrix are {{32, 32, 32, 32, 32, 32, 32, 32}; {44, 38, 25, 9, −9, −25, −38, −44}; {42, 17, −17, −42, −42, −17, 17, 42}; {38, −9, −44, −25, 25, 44, 9, −38}; {32, −32, −32, 32, 32, −32, −32, 32}; {25, −44, 9, 38, −38, −9, 44, −25}; {17, −42, 42, −17, −17, 42, −42, 17}; {9, −25, 38, −44, 44−38, 25, −9}}.

6. The transforming method of claim 5, wherein the first number of bits is different from the second number of bits.

7. A transforming apparatus comprising:
    a block determiner configured to determine a transform unit corresponding to a residual block; and
    a transformer configured to obtain first transformed coefficients by applying a first transform matrix to the transform unit and by performing right-shifting by a first number of bits, obtain second transformed coefficients by applying a second transform matrix to the first transformed coefficients and by performing right-shifting by a second number of bits, and obtain a transform block including transform coefficients based on the second transformed coefficients,
    wherein the first number of bits and the second number of bits are separately predetermined,
    when the first transform matrix is a 4×4 matrix, elements of the first transform matrix are {{32, 32, 32, 32}; {42, 17, −17, −42}; {32, −32, −32, 32}; {17, −42, 42, −17}} or a transposed elements of {{32, 32, 32, 32}; {42, 17, −17, −42}; {32, −32, −32, 32}; {17, −42, 42, −17}}, and
    when the first transform matrix is a 8×8 matrix, elements of the first transform matrix are {{32, 32, 32, 32, 32, 32, 32, 32}; {44, 38, 25, 9, −9, −25, −38, −44}; {42, 17, −17, −42, −42, −17, 17, 42}; {38, −9, −44, −25, 25, 44, 9, −38}; {32, −32, −32, 32, 32, −32, −32, 32}; {25, −44, 9, 38, −38, −9, 44, −25}; {17, −42, 42, −17, −17, 42, −42, 17}; {9, −25, 38−44, 44, −38, 25, −91}}.

8. The transforming apparatus of claim 7, wherein the first number of bits is different from the second number of bits.

* * * * *